(12) United States Patent
Osawa et al.

(10) Patent No.: US 7,127,115 B2
(45) Date of Patent: Oct. 24, 2006

(54) IMAGE PROCESSING APPARATUS AND METHOD, COMPUTER PROGRAM, AND STORAGE MEDIUM

(75) Inventors: Hidefumi Osawa, Saitama (JP); Tadayoshi Nakayama, Tokyo (JP); Ken-ichi Ohta, Kanagawa (JP); Shinichi Kato, Kanagawa (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 770 days.

(21) Appl. No.: 10/393,069

(22) Filed: Mar. 21, 2003

(65) Prior Publication Data
US 2003/0194138 A1 Oct. 16, 2003

(30) Foreign Application Priority Data
Mar. 26, 2002 (JP) .............................. 2002-085507

(51) Int. Cl.
*G06K 9/36* (2006.01)
*G06K 9/46* (2006.01)
(52) U.S. Cl. ...................................... 382/239; 382/233
(58) Field of Classification Search ................ 382/233, 382/234, 239, 251, 266
See application file for complete search history.

(56) References Cited
U.S. PATENT DOCUMENTS

| | | | |
|---|---|---|---|
| 5,402,248 A | 3/1995 | Sato et al. ................... 358/426 |
| 5,732,157 A | 3/1998 | Osawa ....................... 382/244 |
| 5,812,146 A | 9/1998 | Sato et al. ................... 345/501 |
| 5,832,126 A * | 11/1998 | Tanaka ........................ 382/239 |
| 5,861,892 A | 1/1999 | Sato et al. ................... 345/435 |
| 5,986,594 A | 11/1999 | Nakayama et al. ......... 341/107 |
| 6,167,160 A | 12/2000 | Osawa ........................ 382/247 |
| 6,233,355 B1 * | 5/2001 | Kajiwara ..................... 382/238 |
| 6,552,819 B1 * | 4/2003 | Osawa et al. .............. 358/1.17 |
| 2002/0051230 A1 | 5/2002 | Ohta ........................... 358/448 |
| 2003/0002743 A1 | 1/2003 | Ohta et al. .................. 382/239 |
| 2003/0031371 A1 | 2/2003 | Kato et al. .................. 382/239 |
| 2003/0043905 A1 | 3/2003 | Nakayama et al. .... 375/240.04 |

* cited by examiner

*Primary Examiner*—Phuoc Tran
(74) *Attorney, Agent, or Firm*—Fitzpatrick, Cella, Harper & Scinto

(57) ABSTRACT

The present invention allows an image to be coded within a target size without necessitating the image to be input again during the coding of the image, with a mode reflecting a user's intention for coding. To solve this problem, input image data is coded at coding unit 102 and stored into first and second memories, respectively. Coding sequence unit 108 monitors the quantity of codes. When a set value is determined to be reached, coding sequence unit 108 makes data in first memory to be discarded and directs coding means to further increase a quantization step, and continues coding. As previous coded data is stored in second memory, the data is re-coded with the same quantization step as that of coding unit 102 after changing of a parameter at re-coding unit 109, and the re-coded data is stored into first and second memory. At this moment, coding unit 102 and re-coding unit 109 perform an operation and coding on quantization error according to a mode of quantization operation designated at mode designation unit 125.

20 Claims, 37 Drawing Sheets

FIG. 18

| MODE | COMPRESSION RATIO PREFERRED | HIGHER EDGE EMPHASIS | LOWER EDGE EMPHASIS | |
|---|---|---|---|---|
| ENCODER | ROUND-OFF | ROUND-OFF | ROUND-OFF | Q1 |
| RE-CODING FOR FIRST TIME ENCODER RE-ENCODER | CUT-OFF | CONDITIONAL ROUND-UP | CONDITIONAL ROUND-UP | Q2 |
| RE-CODING FOR SECOND TIME ENCODER RE-ENCODER | CUT-OFF | CONDITIONAL ROUND-UP | CUT-OFF | Q3 |
| RE-CODING FOR THIRD TIME ENCODER RE-ENCODER | CUT-OFF | CONDITIONAL ROUND-UP | CUT-OFF | Q4 |

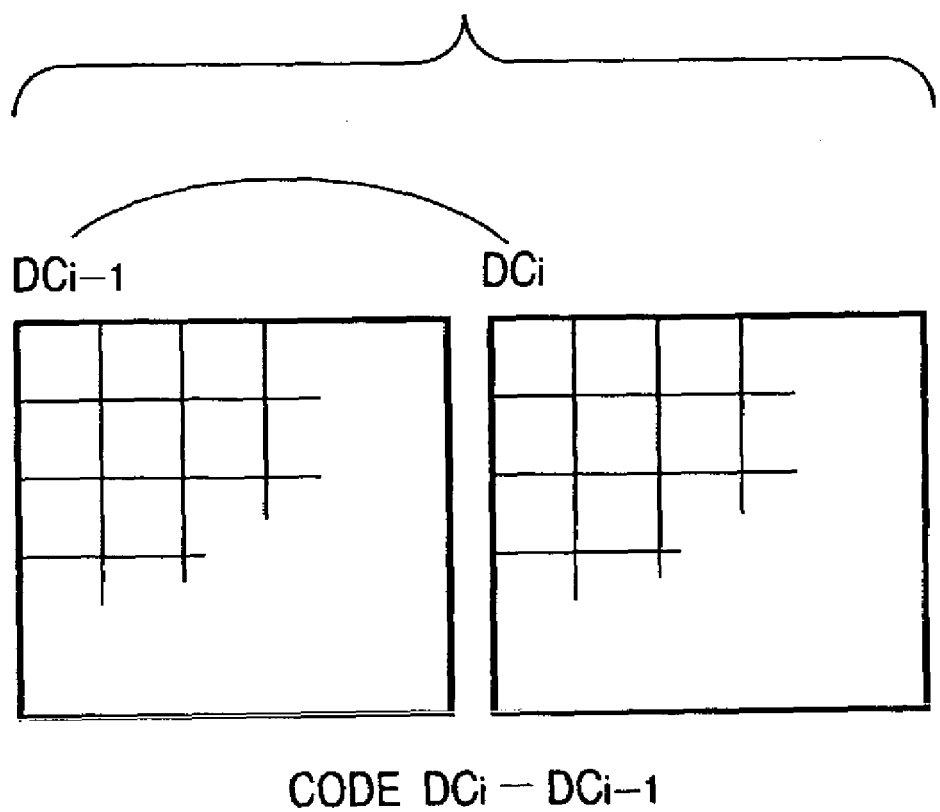

FIG. 20C

GROUPING OF DIFFERENCE BETWEEN DC COMPONENTS

| SSSS GROUP NUMBER | DC DIFFERENCE | NUMBER OF OVERHEAD BIT |
|---|---|---|
| 0 | 0 | 0 |
| 1 | −1, 1 | 1 |
| 2 | −3, −2, 2, 3 | 2 |
| 3 | −7..−4, 4..7 | 3 |
| 4 | −15..−8, 8..15 | 4 |
| 5 | −31..−16, 16..31 | 5 |
| 6 | −63..−32, 32..63 | 6 |
| 7 | −127..−64, 64..127 | 7 |
| 8 | −255..−128, 128..255 AND SO ON | 8 |

FIG. 20D

CODING TABLE FOR DIFFERENCE BETWEEN DC COMPONENTS
(EX. FOR BRIGHTNESS)

| SSSS GROUP NUMBER | CODE |
|---|---|
| 0 | 00 |
| 1 | 010 |
| 2 | 011 |
| 3 | 100 |
| 4 | 101 |
| 5 | 110 |
| 6 | 1110 |
| 7 | 11110 |
| 8 | 111110 |
|   | AND SO ON |

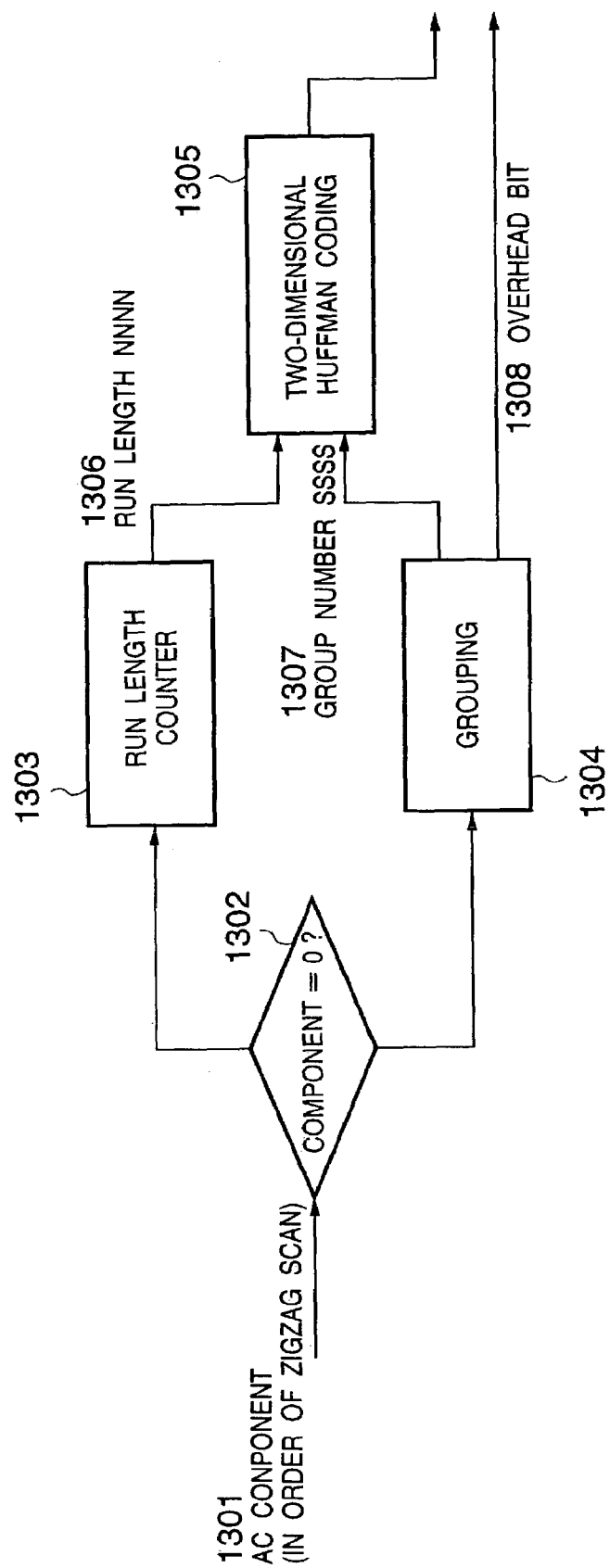

QUANTIZED DCT COMPONENTS

FIG. 23

GROUPING OF AC COMPONENTS

| SSSS | AC COMPONENT VALUE | NUMBER OF OVERHEAD BITS |
|---|---|---|
| 0 | 0 | 0 |
| 1 | −1, 1 | 1 |
| 2 | −3, −2, 2, 3 | 2 |
| 3 | −7..−4, 4..7 | 3 |
| 4 | −15..−8, 8..15 | 4 |
| 5 | −31..−16, 16..31 | 5 |
| 6 | −63..−32, 32..63 | 6 |
| 7 | −127..−64, 64..127 | 7 |
| 8 | −255..−128, 128..255 AND SO ON | 8 |

FIG. 24

| NNNN RUN | SSSS SIZE | CODE LENGTH | | OVERHEAD BIT | TOTAL |
|---|---|---|---|---|---|
| 0 | 0 | 4 | 1010 | | 4 |
| 0 | 1 | 2 | 00 | 1 | 3 |
| 0 | 2 | 2 | 01 | 2 | 4 |
| 0 | 3 | 3 | 100 | 3 | 6 |
| 0 | 4 | 4 | 1011 | 4 | 8 |
| 0 | 5 | 5 | 11010 | 5 | 10 |
| 0 | 6 | 7 | 1111000 | 6 | 13 |
| 0 | 7 | 8 | 11111000 | 7 | 15 |
| 0 | 8 | 10 | 1111110110 | 8 | 18 |
| 0 | 9 | 16 | 1111111110000010 | 9 | 25 |
| 0 | A | 16 | 1111111110000011 | 10 | 26 |
| 1 | 1 | 4 | 1100 | 1 | 5 |
| 1 | 2 | 5 | 11011 | 2 | 7 |
| 1 | 3 | 7 | 1111001 | 3 | 10 |
| 1 | 4 | 9 | 111110110 | 4 | 13 |
| 1 | 5 | 11 | 11111110110 | 5 | 16 |
| 1 | 6 | 16 | 1111111110000100 | 6 | 22 |
| 1 | 7 | 16 | 1111111110000110 | 7 | 23 |
| 1 | 8 | 16 | 1111111110000111 | 8 | 24 |
| 1 | 9 | 16 | 1111111110000101 | 9 | 25 |
| 1 | A | 16 | 1111111110001000 | 10 | 26 |

FIG. 27

| MODE | IMAGE QUALITY PREFERRED | COMPRESSION RATIO PREFERRED | HIGHER EDGE EMPHASIS | LOWER EDGE EMPHASIS |
|---|---|---|---|---|
| LOW COMPRESSION RATIO | ROUND-OFF | ROUND-OFF | ROUND-OFF | ROUND-OFF |
| HIGH COMPRESSION RATIO | ROUND-OFF | CUT-OFF | CONDITIONAL ROUND-UP | CONDITIONAL ROUND-UP |
| FIRST TIME | CUT-OFF | CUT-OFF | CONDITIONAL ROUND-UP | CUT-OFF |
| SECOND TIME | CUT-OFF | CUT-OFF | CONDITIONAL ROUND-UP | CUT-OFF |

IMAGE PROCESSING APPARATUS AND METHOD, COMPUTER PROGRAM, AND STORAGE MEDIUM

FIELD OF THE INVENTION

The present invention relates to an image processing apparatus for coding image data and a method, a computer program, and a storage medium for storing a program controlling the processing apparatus.

BACKGROUND OF THE INVENTION

JPEG method using a discrete cosine transform and another method using Wavelet transformation have been frequently adopted as a compressing method for a still image. As these types of coding method are variable-length coding method, quantity of codes varies for each image to be coded.

In JPEG method of an international standardized method, only a single set of quantization matrices can be defined for an image, thus, quantity of codes cannot be adjusted without a pre-scan. Therefore, a memory may be overflowed when the method is used in a system with limited memory.

To prevent this overflow, enough memory should be reserved, though image to be input can be not the same in size. Therefore, memory, which can be adapted to the largest possible size of images to be input, has to be reserved in the conventional art.

However, in a device that reserves memory matching an image of the largest size, a smaller size of image is meant to be input in that reserved memory, which is far from effective use of memory.

There is an idea to reserve memory matching an image of the medium size. In this case, code data obtained from a coding process overflows the memory.

As a solution to this problem, there have been methods for rereading an original copy with another compression ratio when an actual quantity of codes exceeds an expected quantity of codes, or for resetting a quantization parameter for adjusting quantity of codes by previously estimating quantity of codes with pre-scanning.

As a method for controlling quantity of codes with pre-scanning, there has been a method for inputting pre-compressed data in an inner buffer memory, expanding this piece of data, altering a compression parameter, performing a main compression, and outputting the compressed data to an external memory. In this case, the main compression should be higher in compression ratio than the pre-compression.

However, a compression buffer with a compression ratio more than a target compression ratio has been needed for a compression buffer. This necessitates an enough capacity for recording a piece of original data in order to prevent an overflow of a buffer that is used in the middle of the procedure.

Moreover, a method of repeating a coding process has had another problem that consecutive processing does not speed up because processes for decoding and recompressing are performed for all pieces of compressed data.

SUMMARY OF THE INVENTION

The present invention is adapted in view of the above-mentioned conventional art and intends to provide an image processing apparatus for allowing an image to be compression coded to a size less than a target size with small memory without needing to input the image again, while having the image reflect a user's desired quality, as well as a method, a computer program, and a computer readable medium for storing program controlling the image processing apparatus.

To solve this problem, an image processing apparatus according to the present invention include the following configuration:

an image processing apparatus for compression coding image data, including:

designating means for designating a mode for a quantization operation;

first compression coding means wherein a quantization step and a parameter involved in a quantization operation can be changed;

second compression coding means for decoding and re-compressing the code data compressed with the first compression coding means wherein a quantization step and a parameter involved in a quantization operation can be changed;

quantity-of-codes monitoring means for monitoring quantity of codes generated with said first compression coding means and determining whether the quantity of code data reaches a predetermined volume or not;

parameter setting means for making the quantization step the step on the next stage, in parallel with setting a parameter in the first and second compression coding means for adapting a quantization operation for the mode designated with the designation means, when the quantity-of-code monitoring means determines that the quantity of code data reaches a predetermined volume;

controlling means for re-coding the code data previously generated with the first compression coding means by using the second compression coding means and storing the re-coded code data into a predetermined storage means as code data after changing a parameter in the first compression coding means, in parallel with saving the coded data generated with the first compression coding means after changing a parameter as subsequent data into the storage means, when a parameter is changed with the parameter setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 18 is a table showing contents of a scenario table by a mode-designating unit in a first embodiment;

FIGS. 20A–20D are diagrams showing a configuration involved in conversion of a direct current component (DC component) of DCT components and descriptions of a coding process in an application of the embodiment;

FIG. 21 is a diagram showing descriptions of a coding process of an alternating current components (AC components) of DCT components in an application;

FIG. 23 is a table for a Huffman coding process of AC components;

FIG. 24 is a diagram showing a part of a Huffman coding table looked up with run length and size;

FIG. 27 is a table showing contents of scenario table with a mode-designating unit in a second embodiment;

DETAILED DESCRIPTION OF THE PREFERRED EMBODIMENTS

Now, embodiments of the present invention will be described in conjunction with attached diagrams, starting with a description of a basic part.

Figure 1:
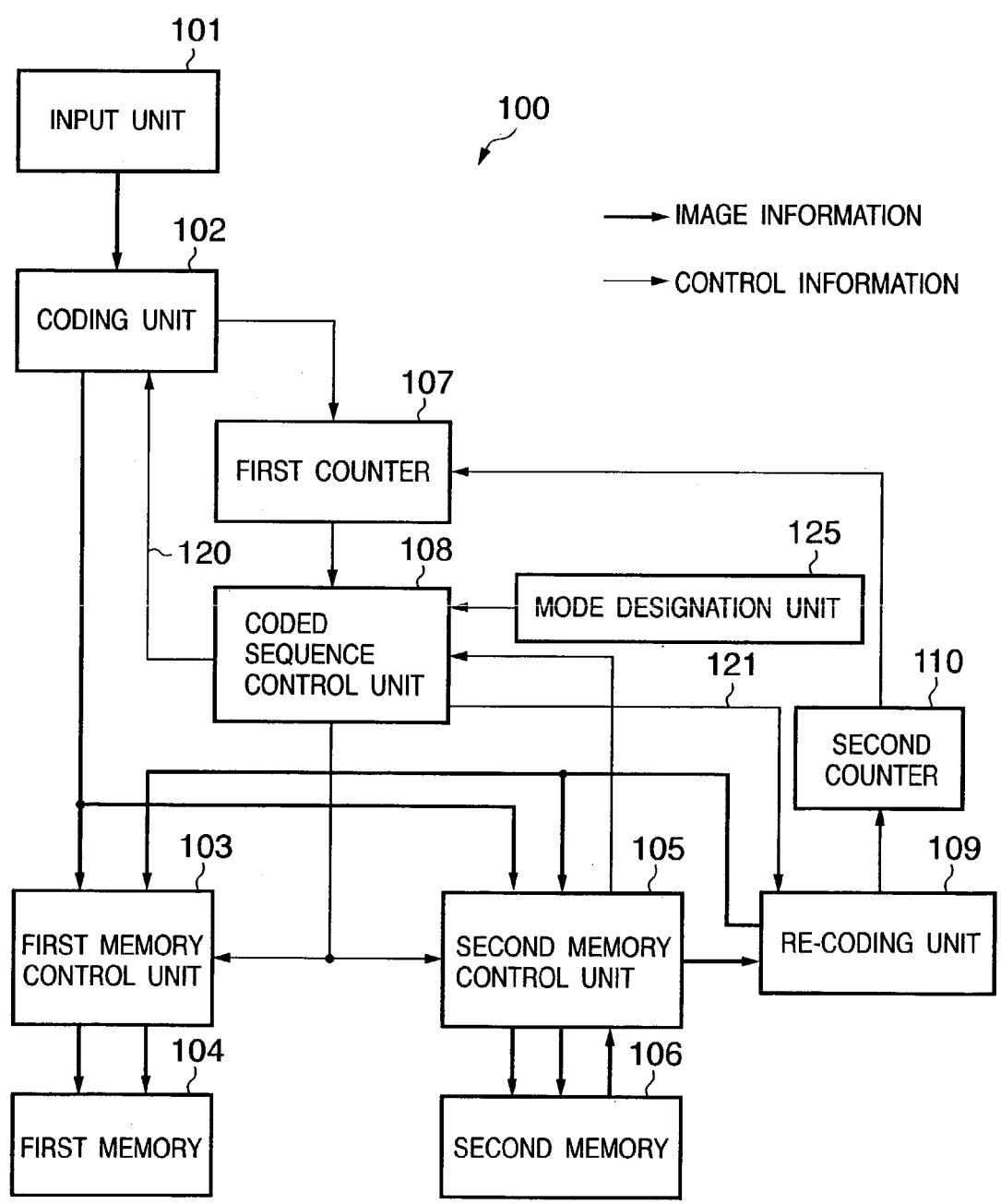
FIG. 1 is a block diagram showing an image processing apparatus of a first embodiment according to the present invention.

FIG. 1 is a functional block diagram showing an image processing apparatus 100, to which an embodiment is applied. Next, each part of the diagram will be briefly described.

Image processing apparatus 100 includes input unit 101 for inputting an image from an image scanner. Input unit 101 can be implemented by inputting image data from means for rendering a page description language to raster image and the like or reading in an image file stored in a storage medium, or otherwise image data can be received from a network if needed.

Coding unit 102 performs coding of input image data. A well-known JPEG method is used as a coding method for performing orthogonal transform on image data corresponding to 8×8 pixel and performing quantization by using a quantization step described below and Huffman coding.

First memory control unit 103 and second memory control unit 105 control each piece of the above-mentioned coded data (the same piece of coded data) output from the above-mentioned coding unit 102 to make them stored into first memory 104 and second memory 106, respectively. First memory 104 is a memory for holding a finally defined (compressed to a data volume within a target volume) piece of coded data in order to output the piece of coded data to a network device, image output device, a mass-storage device and the like, which externally connected to a basic configuration shown in FIG. 1. Second memory 106 is a working memory for helping a compression coding process to form the above-mentioned coded data on first memory.

Counter 107 counts a data volume of an image compression coded by coding unit 102 and holds the count value in parallel with outputs the count value to coded sequence-control unit 108, which controls a coded sequence according to the result of the count.

Coded sequence-control unit 108 determines whether a count value at counter 107 reaches a set value or not. When it is determined that the count value reaches the set value (exceeds a target value), coded sequence control unit 108 outputs a control signal to first memory control unit 103 to discard a piece of stored data within memory 104. The above-mentioned first memory control unit 103 discards the above-mentioned piece of stored data by clearing a memory address counter or coded data management table on the basis of the control signal. At this moment, coded sequence-control unit 108 zero-clears first counter 107 (input from input unit 101 is still keeping), while controlling coding unit 102 to make it code at a higher compression ratio than before. That is to say, coded sequence control unit 108 controls a data volume of coded data, which occurs in a coding process of the present invention to be finally reduced to half, for example. Although it is described that a data volume is reduced to half in this example, it is matter of course that the target volume can be set to any value.

A piece of coded data after changing of compression ratio is stored via first memory control unit 103 and second memory control unit 105 into first memory 104 and second memory 106, respectively, in the similar manner.

When a count value at counter 107 reaches a set value, coded sequence-control unit 108 outputs a control signal to second memory control unit 105 to read out a piece of coded data stored in second memory 106 and output the piece of coded data to re-coding unit 109, which is means for converting coded data.

Re-coding unit 109 decodes a piece of input coded data, performs re-quantization and the like for reducing a data volume followed by a coding process again, and outputs the data volume for the same compression ratio as that of coding unit 102 after changing of a compression ratio to second counter 110.

The piece of coded data output from re-coding unit 109 is stored via first memory control unit 103 and second memory control unit 105 into first memory 104 and second memory 106, respectively.

Second memory control unit determines whether or not a re-coding process finishes. That is to say, when no piece of data is left to be read out for a re-coding process, the second memory control unit informs the end of a re-coding process to coded sequence-control unit 108. Actually, a coding process completes not only after the end of a reading-out process of second memory control unit 105 but also the end of a process of recoding unit 109.

A count value obtained at second counter 110 is added to a counter value held in first counter 107 after the completion of a re-coding process. This total value represents a sum of data volume within first memory 104 immediately after the completion of a re-coding process. More specifically, at the moment when each coding process of coding unit 102 and re-coding unit 109 for a single screen (a single page) ends, a counter value held in first counter 107 after the above-mentioned addition represents a total data volume, which occurred when a device of the present invention codes data for a single screen (a single page). (detailed description will be given in below.)

Coding unit 102 keeps coding as far as image data from input unit 101 to be coded remains no matter irrespective of whether or not a re-coding process ends.

Determination of whether or not a count value in counter 107 reaches a set value is kept repeating until a coding-process (coding and re-coding) of image data for a single page input from input unit 101, and the above-mentioned coding and re-coding process is performed under a control according to the obtained determination result.

The above-mentioned process is described in more understandable way as follows.

Image data input from input unit 101 is compression coded at coding unit 102 according to a quantization parameter Q1 in an initial stage. The generated compression coded data is written in first memory 104 and second memory 106, respectively. At this moment, first counter 107 counts a coded data volume to be generated. In the case that a compression coding process completes with the coded data volume under a set volume, data stored in first memory 104 is output to outside, and a following piece of image, if any, is input with resetting counters 107 and 110.

On the other hand, in the case that coded sequence control unit 108 determines that a coded data volume to be generated reaches a set value during a coding process of a page, image data is kept input with making a piece of data within first memory 104 discarded and making a quantization parameter Q2 of the next stage set in coding unit 102 to cause a compression ratio higher. Accordingly, image data input after the determination of a set value being reached is coded in much higher compression ratio. Coded data before a coded data volume reaches a set value (data coded with quantization parameter Q1 is stored in second memory 106. Then, the data is re-coded at re-coding unit 109 and the result is stored into first memory 104 and second memory 106, respectively. A quantization parameter used for re-coding at re-coding unit 109 is the same as quantization parameter Q2 at coding unit 102 after changing. When previous coded data stored in second memory 106 has been re-coded, the code volume, which is stored in second counter 110, is added to first counter 107.

As a result, pieces of coded data compressed with quantization parameter Q2 started from the top of a page are stored in first memory 104 and second memory 106, respectively. When it is determined that a value at counter 107 reaches a set value again during a compression coding process with quantization parameter Q2, quantization parameter Q3 is set to coding unit 102 and re-coding unit 109 to make a compression ratio higher, and the above-mentioned process is performed. Then, when it is determined that a set value is reached even with quantization parameter Q3, a quantization parameter will be set as Q4.

In the embodiment, quantization parameter Qi (i=1,2,3) to be set in coding unit 102 and re-coding unit 109 consists of two components; a quantization step and an operation mode at quantization (a mode for designating a way of dealing with an operation error).

A quantization step is incremented by m times (m>1) such as $Q2=Q1\times m$, $Q3=Q2\times m$, $Q4=Q3\times$(needs not to be equi-multiples). As a quantization step increases, a frequency component value after DCT conversion results in being represented in a small value, i.e., in a small bit number, thus, a data volume can be reduced.

An operation mode can be decided according to a mode designated at mode designation unit 125 by operator.

Types of operation mode to be designated at mode designation unit 125 are three types; compression ratio preferred, higher edge emphasis, lower edge emphasis (the number of types can be more or less than three).

Contents of each operation mode are described in FIG. 18. FIG. 18 shows a scenario table based on a mode designated at mode designation unit 125, which is previously stored in coded sequence control unit 108 as a table (memory). Each mode is described as follows.

[Compression Ratio Preferred]

When there is no re-coding (i.e., when coding is performed while a set value is not reached), round-off is selected at an encoder. At the moment of re-coding, cut-off is selected.

[Higher Edge Emphasis]

When there is no re-coding, round-off is selected at an encoder. At the moment of re-coding, a conditional round-up process is selected. The term conditional round-up used here refers to performing a rounding up process when the value of DCT components is larger than a predetermined threshold (otherwise, the value is cut off). This is because, when a DCT component is small, influence of a round-up process of the component becomes great, resulting in forming a noise component.

[Lower Edge Emphasis]

When there is no re-coding, round-off is selected at an encoder. When a set value is reached for the first time, a conditional round-up process is performed. When a set value is reached for the second time and after, a cut-off process is performed without any condition.

Figure 8:
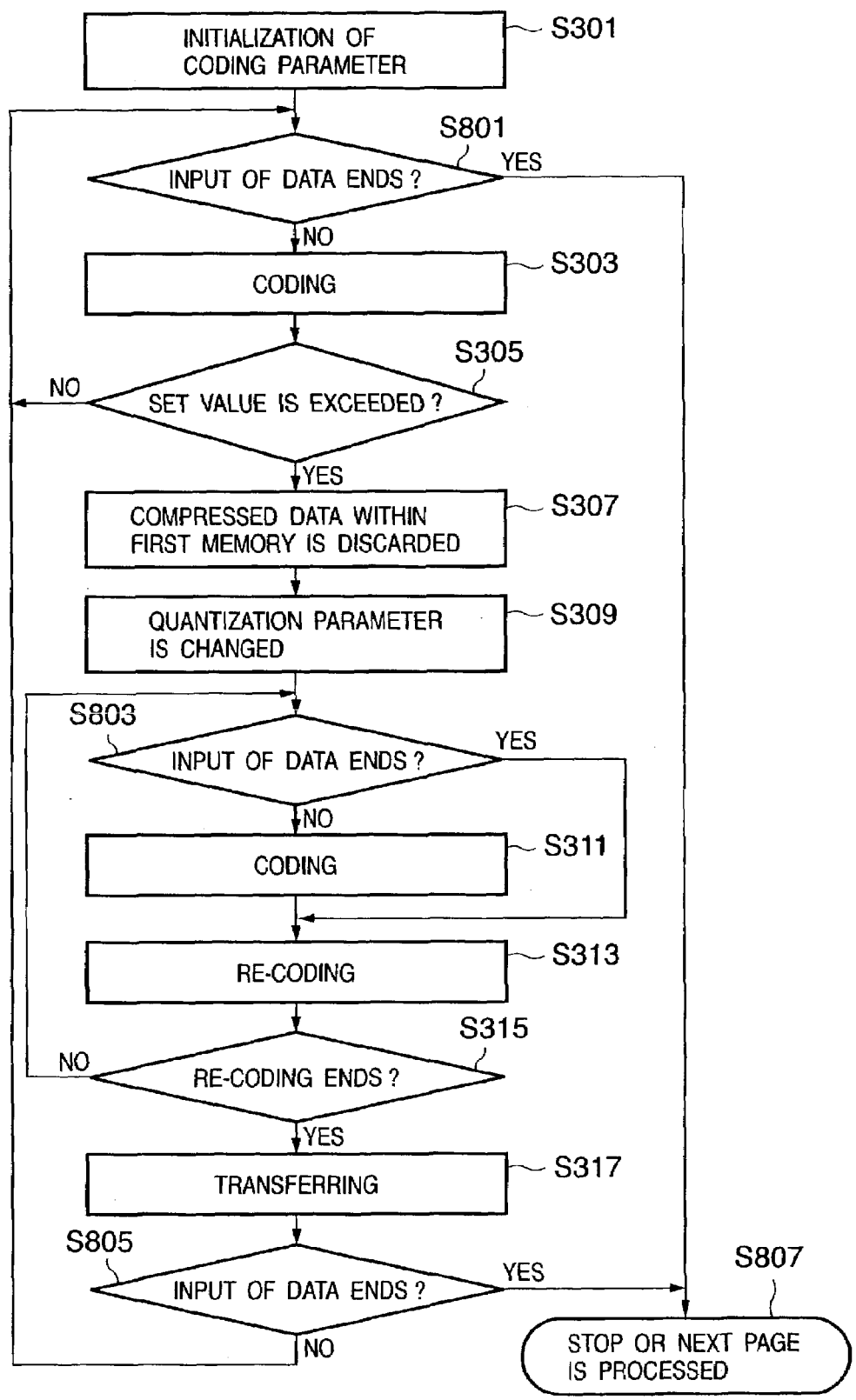
FIG. 8 is a flowchart showing a process performed in the configuration shown in FIG. 1 in detail.

Although FIG. 8 shows a flowchart illustrating a flow of a process performed in the above-mentioned configuration shown in FIG. 1, the flow is described with reference to the simplified flowchart shown in FIG. 3 for simplicity.

As mentioned above, image processing apparatus 100 according to the present invention is a device for compression coding image data for a single page input from input unit 101 of a scanner and the like down to a volume less than a predetermined data volume. To accomplish the coding process, image processing apparatus 100 includes coding unit 102, re-coding unit 109, first memory 104, second memory 106, etc. in addition to the input unit 101. A coding process is performed with these function blocks according to FIG. 3.

Figure 3:
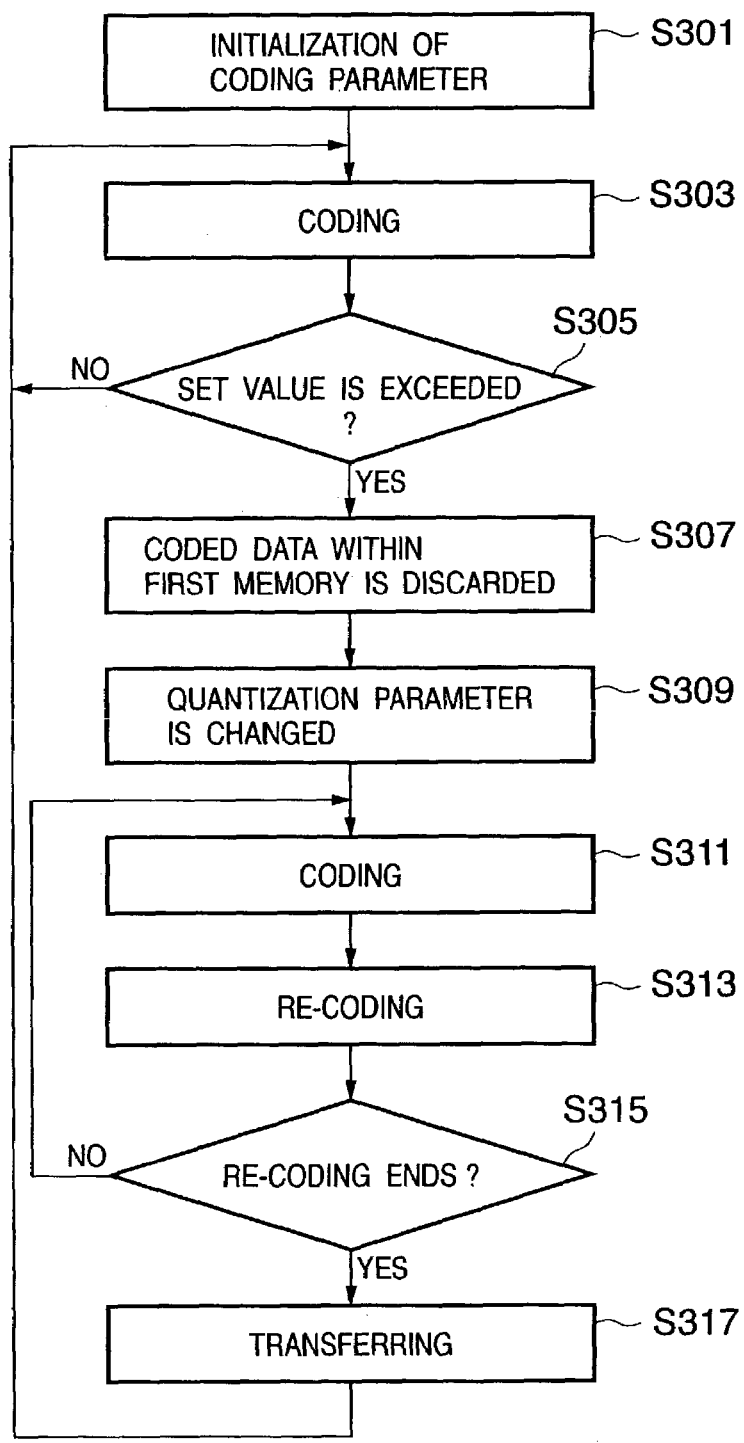
FIG. 3 is a flowchart showing a process performed in the configuration shown in FIG. 1 in a simplified manner.

A flowchart shown in FIG. 3 is roughly divided into the following three processing phases.
(1) coding phase
(2) coding and re-coding phase
(3) transfer phase FIGS. 4 to 7 illustrate a flow of image data, coded data and the like, while they are processed and stored into a memory in each of the above-mentioned processing phases in a visually understandable fashion.

Figure 4:
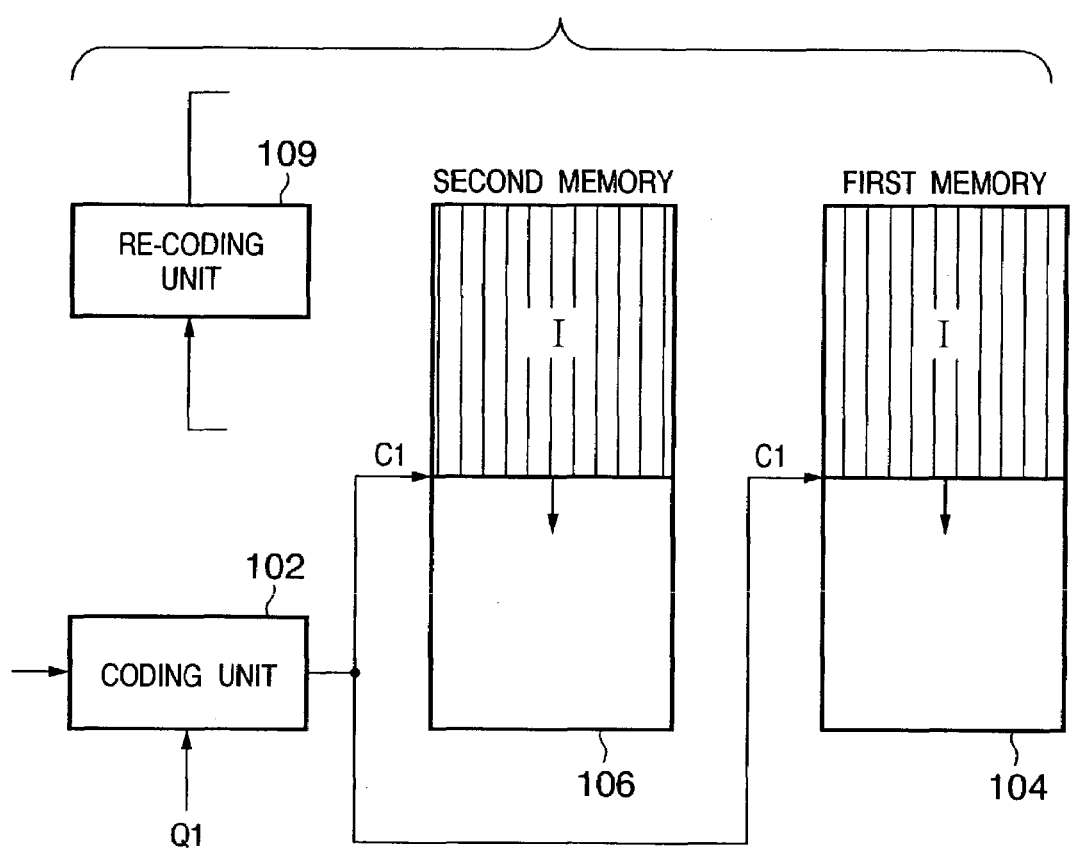
FIG. 4 is a diagram showing a data flow and contents of a memory in a coding phase of an initial state.
Figure 5:
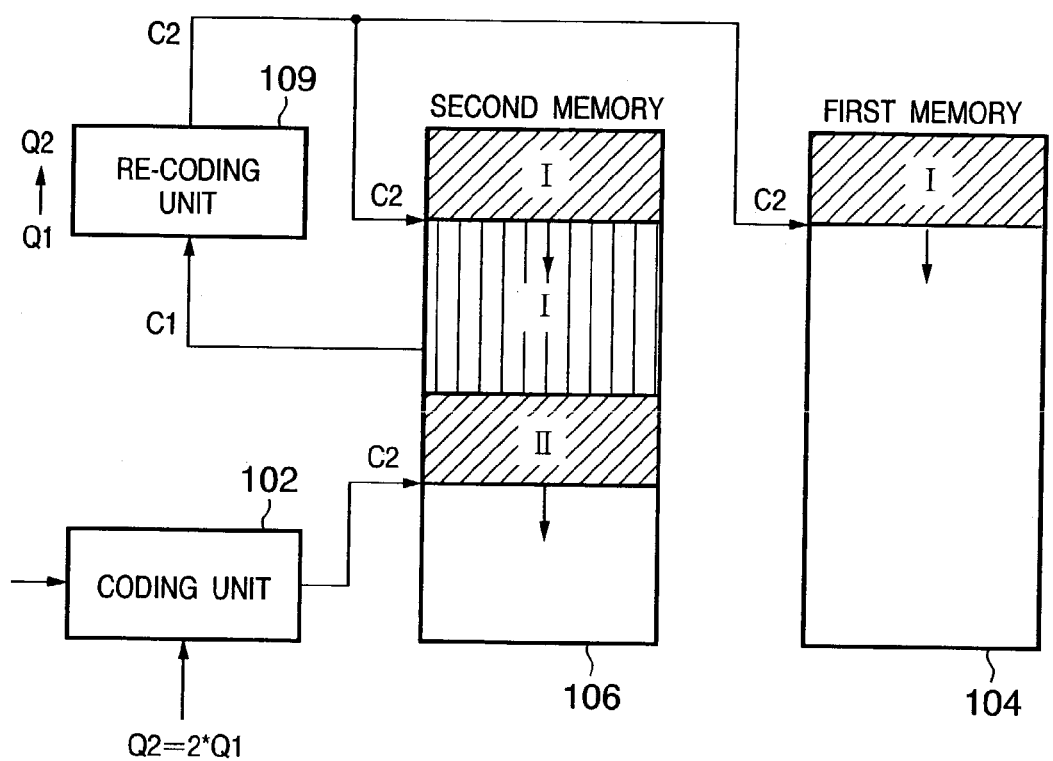
FIG. 5 is a diagram showing a data flow and contents of a memory in a coding and re-coding phase.
Figure 6:
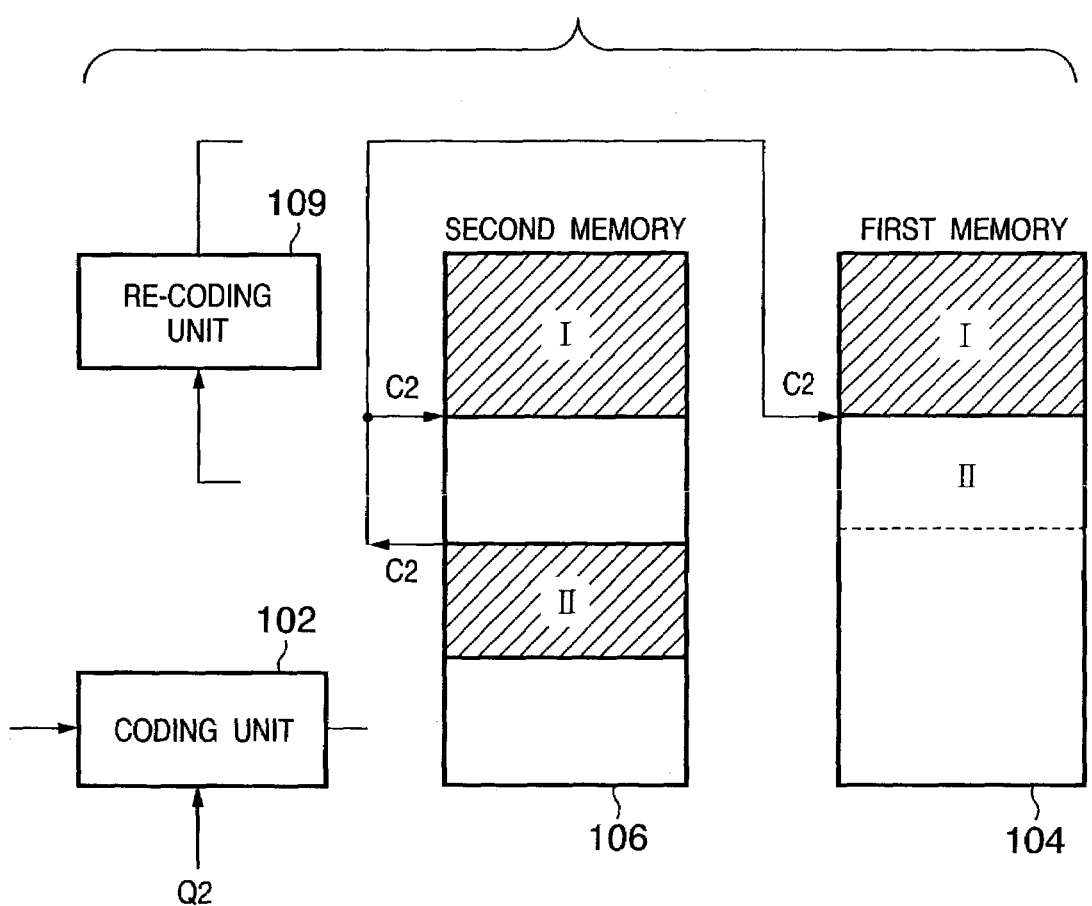
FIG. 6 is a diagram showing a data flow and contents of a memory in a transfer phase.
Figure 7:
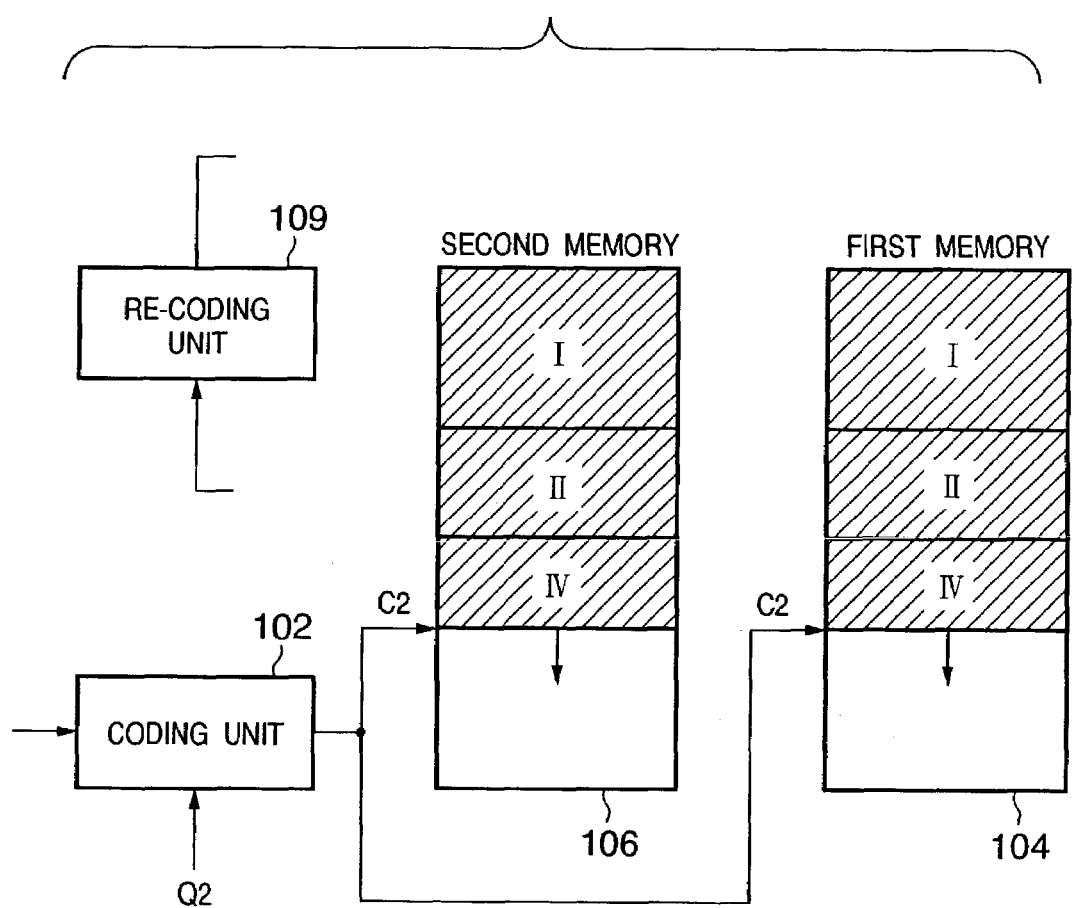
FIG. 7 is a diagram showing a data flow and contents of a memory in a coding phase after a transfer phase.

FIG. 4 shows an initial state of a coding phase corresponding to steps S303 and S305 in the flowchart shown in FIG. 3. FIG. 5 shows a processing state of a coding and re-coding phase corresponding to steps from S307 to S315, FIG. 6 shows a processing state of a transfer phase corresponding to step S317, and FIG. 7 shows a processing state of a coding phase following to a transfer phase, respectively. Each phase will be described below.

<<Coding Phase>>

A coding process of image data for a single page starts with initialization designated at mode designation unit 125 of a coding parameter (step S301). At this step, the upper limit value of a coded data volume uniquely decided from a size of image to be coded (a paper size to be read from input unit 101 of a scanner and the like) or quantization parameters (a quantization step and an operation mode) applied to coding unit 102 (a well-known JPEG coding method is used here).

Then, at step S303, first counter 107 performs an actual coding process (JPEG compression of an image by 8×8 pixel), and cumulatively counts a data volume of output coded data.

Next, at step S305, it is determined whether a count value of the data volume exceeds the above-mentioned upper limit value. If the value is determined not to exceed the upper limit value, a JPEG process at step S303 continues. This is a coding phase of an initial state.

Pieces of coded data output from coding unit 102 are stored one after another into both of first memory 104 and second memory 106 as shown in FIG. 4. Areas indicated by vertical stripes represent the stored codes.

<<Coding and Re-Coding Phase>>

When a coding process at coding unit 102 proceeds and a count value of the above-mentioned data volume exceeds a set upper limit value, coded data within first memory 104 is discarded at step S307 and a quantization parameter for coding unit 102 is changed to Q2.

The fact that a count value of data volume of coded data exceeds a set upper limit value means that a data volume after compression overflows a target value. Therefore, it is of no use in continuing a coding process by using the same quantization step, thus, a quantization step is changed to Q2, which is wider than Q1 to reduce a data volume than before. This setting is done according to a scenario set to a quantization operation mode.

After a quantization step and contents of quantization operation are changed, a coding process resumes at coding unit 102 at step S311, and coded data is stored only into second memory 106 as shown in FIG. 5. In parallel with this process, a re-coding process at step S313 is performed. During the re-coding process, coded data stored in second memory 106 is read out, re-coded at re-coding unit 109, and stored into the above-mentioned two memories 104 and 106. The coding process and re-coding process are continued until all the codes indicated by vertical stripes I are re-coded. Re-coded data output from re-coding unit 109 is the same as that from coding unit 102 after a quantization parameter is changed.

More specifically, this re-coding process is accomplished by performing a bit-shift process on each quantization value after coded data is Huffman decoded, which leads the same result as that from the quantization value divided by $2^n$, and then performing Huffman coding again (if m=2). In this method, a high-speed re-coding process can be performed because only a bit shift process changes a quantization step, and because neither inverse-orthogonal transform nor re-orthogonal transform is performed. At step 315, it is determined whether or not a re-coding process ends.

As a data volume after re-coding is less than a data volume of coded data before re-coding, coded data after re-coding can be stored in overwriting manner into a memory area, which stored a code before re-coding, as shown in FIG. 5. When a re-coding process ends, a data volume of coded data indicated by vertical stripes I is reduced to a data volume of coded data indicated by oblique stripes I as shown in FIG. 6.

The above-mentioned steps from S307 to S315 are processes performed in a coding and re-coding phase.

<<Transfer Phase>>

When a re-coding process ends, a transfer process is performed at step S317. In the transfer process, coded data indicated by oblique stripes II that is stored only in second memory 106 in a coding and re-coding phase is transferred to and stored in an address to be connected with coded data indicated by oblique stripes I within first memory 104. In parallel, coded data indicated by oblique stripes II is transferred within second memory 106 connected with coded data indicated by oblique stripes I in order to make the coded data indicated by oblique stripes I and coded data indicated by oblique stripes II, which are dispersed on second memory 106, stored in series on first memory 104. This is a process performed in a transfer phase.

When the above-mentioned transfer phase ends, the process returns in a coding phase at steps S303 and S305, where a code indicated by oblique stripes IV is output from coding unit 102 and stored into two memories 104 and 106 as shown in FIG. 7. This coding phase is slightly different from a coding phase in an initial state (see FIG. 4). In this phase, a quantization step for coding at coding unit 102 is changed from Q1 to Q2 and coded data stored in two memories 104 and 106 is a collection of codes processed in various phases. Without these differences, a coding phase immediately after a transfer phase is considered to be the same as a coding phase of an initial state.

Therefore, by repeating three phases of a coding phase, a coding and re-coding phase and a transfer phase, codes of image data for a single page finally compressed to a volume less than a set value of data volume can be stored in first memory. Moreover, input unit 101 only keeps inputting until a series of processes ends. In other words, image need not to be input from the beginning again.

In the flowchart shown in FIG. 3, only processes corresponding to respective phases shown in FIGS. 4, 5, and 6 are shown for clarity. However, input of image data for a single page actually ends at one of the phases. Therefore, data is dealt with differently after the end of input according to which phase the input ends. A flowchart shown in FIG. 8 illustrates a flow in consideration of the difference. The flowchart of FIG. 8 is a flowchart shown in consideration of relationship between a completion of input of image data for a single page and each process described in FIG. 3, which is a flowchart of FIG. 3 added with steps S801, S803, S805 and S807.

Steps S801, S803, and S805 determine whether or not input of image data for a single page from input 101 ends in a coding phase, a coding and re-coding phase, and a transfer phase, respectively.

When it is determined that input of image data for a single page ends in a coding phase and a transfer phase (steps S801 and S805), the process continues to step S807, where a compression coding of the page ends. Then, if image data one or more page to be processed exists, a compression coding for image data of the next one page starts (each counter is reset and a quantization parameter is set to an initial value). If no image of one or more one page to be processed exists, the process comes into a suspended state.

On the other hand, when it is determined that input of image data for a single page ends in a coding and re-coding phase (step S803), a coding process at step S311 is passed because an operation should stop until no image data lefts to be re-coded in coding unit 102. Then, at step S313, only a re-coding process continues for reducing image data, which has been coded at coding unit 102, to a predetermined coded data volume. When all the re-coding processes and a following transfer process ends, pieces of coded data for the entire image data for a single page are not collected on first memory, thus, a re-coding process and a following transfer process should continue even after input of image data for a single page ends. Then, when it is determined that all the re-coding processes end at step S315, coded data stored only in second memory 106 is transferred to first memory during a coding and re-coding phase (step S317). Then at the next step S805, it is determined that input of image data for a single page ends, and the process continues to step S807.

The operation has been described above, which is also a description of an operation of FIG. 8.

<Alteration of Memory Storage Method>

Figure 9:
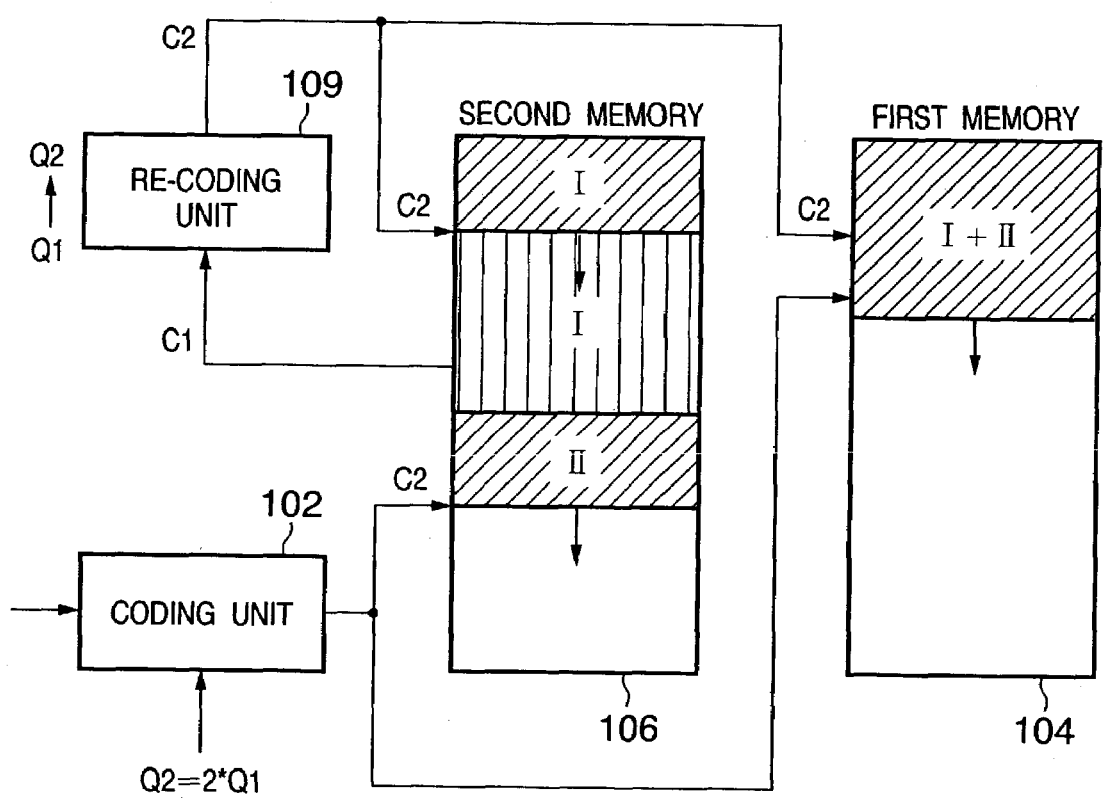
FIG. 9 is a diagram showing a data flow and contents of a memory in a coding and re-coding phase in an alteration of the configuration shown in FIG. 1.
Figure 10:
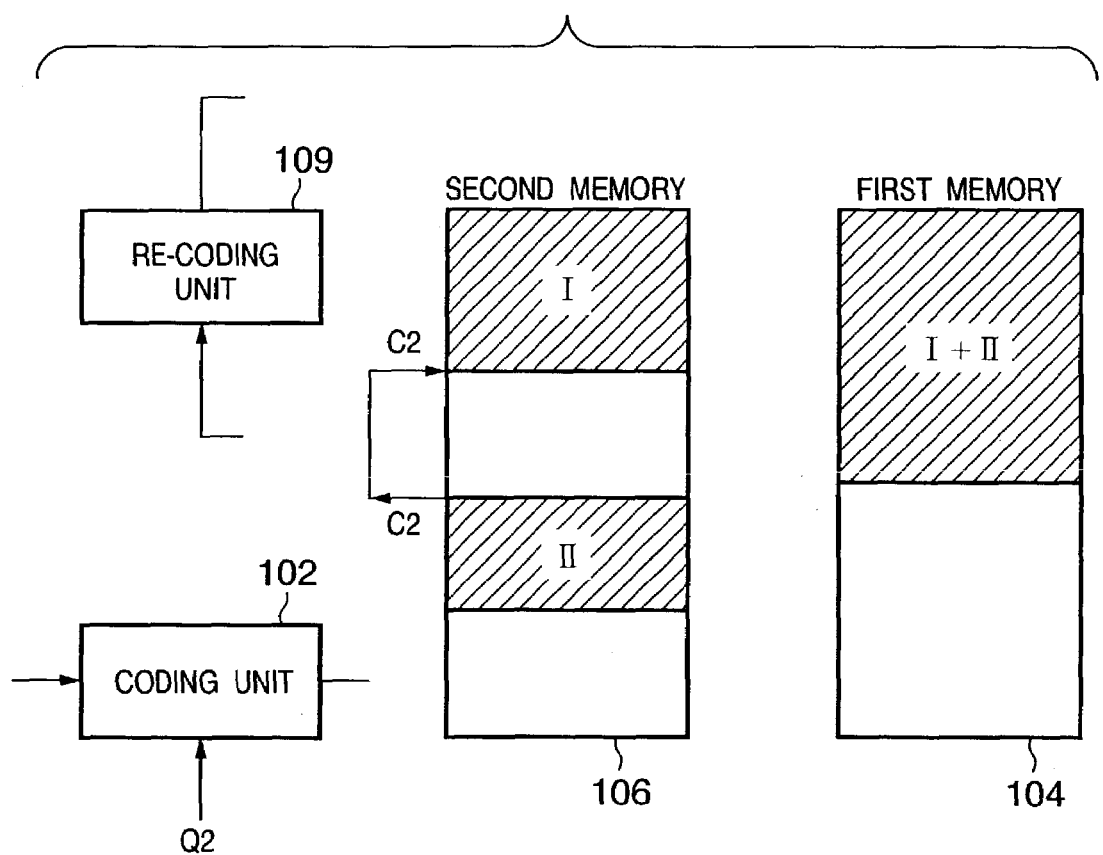
FIG. 10 is a diagram showing a data flow and contents of a memory in a transfer phase in an alteration of the configuration shown in FIG. 9.

FIGS. 9, 10 are diagrams showing alterations of a memory storage method shown in a conceptual diagram of FIGS. 5, 6.

In a conceptual diagram of FIG. 5, coded data output from coding unit 102 is stored only in second memory 106 in a coding and re-coding phase, though, coded data output from coding unit 102 is directly stored into both of first and second memories in a coding and re-coding phase as shown in FIG. 9.

From a viewpoint of coding unit 102, coded data coded and output in any phase will be stored into both memories. Different from a conceptual diagram of FIG. 6, data need not be transferred between memories in a transfer phase as shown in FIG. 10. In this alteration, coded data and re-coded data are stored in the order that they are sent to first memory 104 in a coding and re-coding phase. For this reason, there is a problem that two types of data are mixed.

Therefore, in this alteration, the coded data is divided into specific units to be managed as a file or a packet to deal with this problem. More specifically, a file management table, a packet management table or some other table is created and managed.

As an approach, when data from coding unit 102 is stored into first memory 104, a management table is created for allocating a management number to each of appropriate unit of data (as a unit used for the orthogonal transform is a block of 8×8, thus, pieces of data for 8×i lines (i=integer of 1, 2 . . . ), for example) from the top of the image data, for storing each storage top address and the coded data volume corresponding to each of the management number in the order of the management number.

Coding unit 102 and re-coding unit 109 hold a management number for each piece of data under processing, and write a top address and coded data volume of coded data when it is stored into the management table on the basis of the management number. Even if pieces of coded data processed at coding unit 102 and re-coding unit 109 are stored randomly, a piece of coded data can be read out from the top of the image in order by accessing the management table in the order of management numbers and reading out a piece of coded data from first memory 104 on the basis of a top address and a coded data volume read out at the moment, in this manner. With such a management facility, continuous pieces of data on an image need not be stored continuously on memory.

Figure 11:
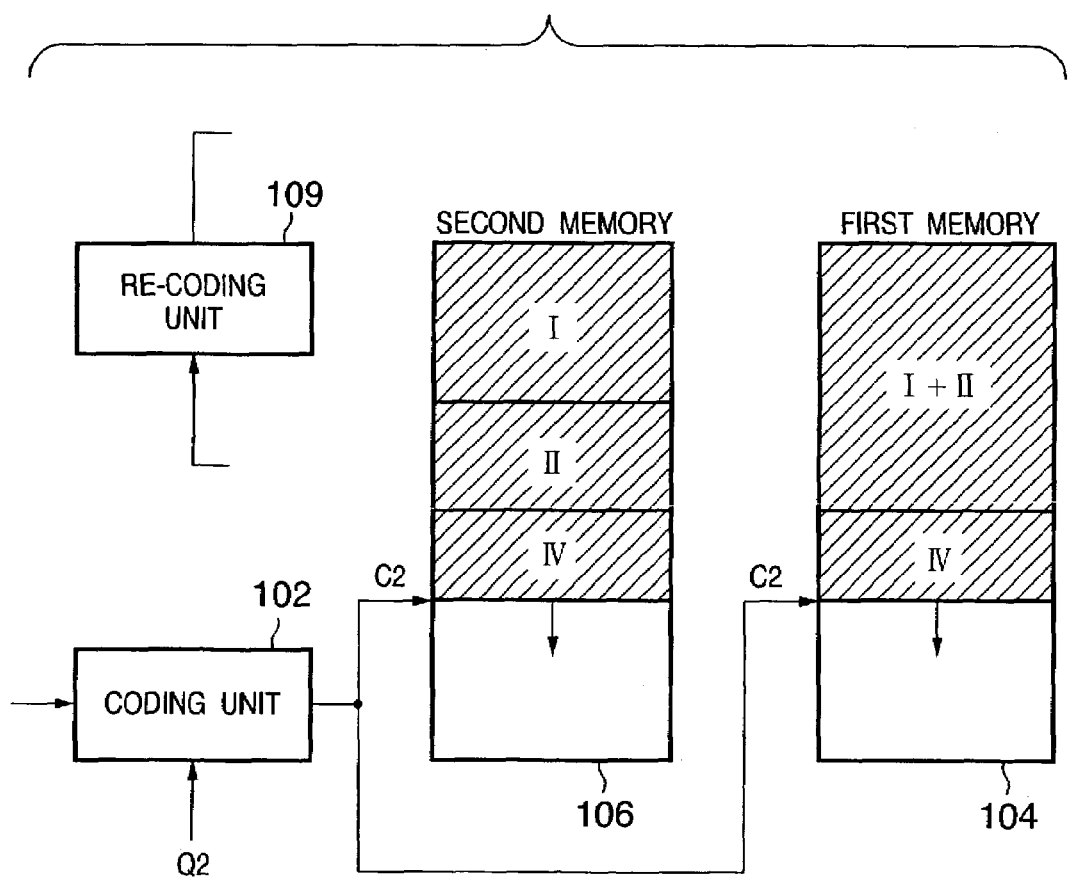
FIG. 11 is a diagram showing a data flow and contents of a memory in a coding phase after a transfer phase in an alteration of the configuration shown in FIG. 9.

A coding phase following to a transfer phase in a conceptual diagram of FIG. 10 is almost the same as those described two coding phases (see FIG. 4 and FIG. 7), with a slight difference in a state of storage of a code within first memory as shown in FIG. 11. Therefore, the previous example and this alteration are the same in processing by repeating three phases.

<Second Embodiment>

Next, a second embodiment for performing a coding process characteristic in the present invention will be described with reference to FIG. 2 (a configuration described above is called as a first embodiment).

Figure 2:
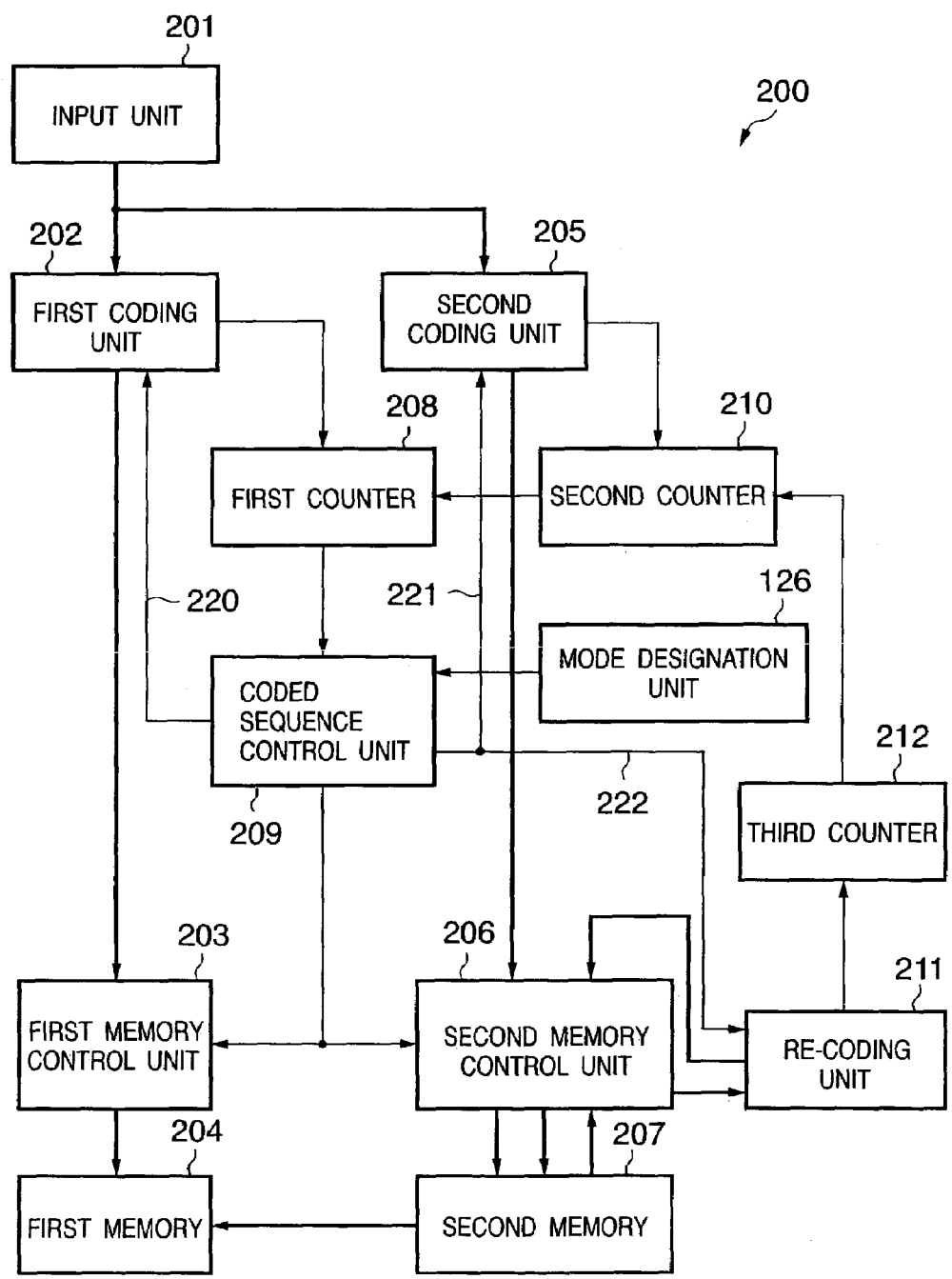
FIG. 2 is a block diagram showing an image processing apparatus of a second embodiment according to the present invention.

FIG. 2 is a block diagram showing image processing apparatus 200 of a second embodiment.

A big difference between image processing apparatus 200 and image processing apparatus 100 according to the first embodiment shown in FIG. 1 is that image processing apparatus 200 has two coding units in parallel that initially perform coding. Image processing apparatus 200 codes image data input from input unit 201 in first coding unit 202 and second coding unit 205 in parallel, and generates two types of coded data whose compression ratios are different from each other. In the second embodiment, a well-known JPEG method is also used as a coding method for performing orthogonal transform on image data corresponding to 8×8 pixel and performing quantization by using a quantization step described below and Huffman coding.

In this example, a case that a higher compression ratio is set in second coding unit 205 than in first coding unit 202 will be described. More specifically, according to an operation mode designated at mode designation unit 126, a quantization parameter in first coding unit 202 is set to Q1 and a quantization parameter in second coding unit 205 is set to Q2, respectively (a quantization step for Q2 is bigger than that for Q1.).

Coded data output from coding unit 202 is stored via first memory control unit 203 into first memory 204. At this moment, first counter 208 counts a data volume of coded data output from coding unit 202 and holds the count while outputting the count to coded sequence control unit 209.

On the other hand, coded data coded at coding unit 205 is stored via second memory control unit 206 into second memory 207. At this moment, second counter 210 counts a data volume of coded data output from coding unit 205 and holds the count. In addition, when coded data stored in second memory 207 described below is transferred to first memory 204, the above-mentioned count value is also transferred to first counter 208.

If a data volume of coded data output from coding unit 202 reaches a set value when first counter 208 counts the volume, coded sequence control unit 209 outputs a control signal to memory control unit 203 to discard data stored in first memory 204 as in the first embodiment.

Coded sequence control unit 209 outputs a control signal to memory control unit 206 and memory control unit 203 to cause them to read out coded data stored in second memory 207, transfer the data to first memory 204 to be stored therein. As a result, a count value of second counter 210 is transferred to first counter 208 and the value is loaded as a counter value of first counter (overwrites previous one).

That is to say, as a count value of the above-mentioned second counter 210 represents a data volume of coded data stored in second memory 207, it can be considered that the count value and the coded data are copied into first counter and first memory as they are with keeping their correspondence.

Moreover, coded sequence control unit 209 outputs a control signal to first coding unit 202 and second coding unit 205 to cause them to perform coding that results in coded data less than before.

For example, each quantization step in first coding unit 202 and second coding unit 205 is changed to twice. As a result, first coding unit 202 inherits a quantization parameter Q2 in second coding unit 205, which was used immediately before, and second coding unit 205 performs a coding process with much higher compression ratio by using much bigger quantization step Q3 in case of the next overflow.

Although the quantization step is changed to twice in this example, it is matter of course that the step can be set to any value without being limited to twice. Pieces of coded data output from each of changed coding units 202 and 205 are stored via corresponding memory control unit 203 and 206 into corresponding memories 204 and 207, respectively.

Coded sequence control 209 outputs a control signal to memory control unit 206 to cause it to read out coded data already stored in second memory 207 and send the data to re-coding unit 211. Re-coding unit 211 performs a re-coding process of coded data as in re-coding unit 109 shown in FIG. 1.

Third counter 212, which counts a data volume output from re-coding unit 211, is reset to zero immediately before starting a re-coding process and starts counting an output data volume during a re-coding process. The counter 212 transfers the obtained count value to second counter 210 when the re-coding process ends.

Second counter 210 calculates a total data volume of coded data and re-coded data, which are stored into memory 207 during a re-coding process by adding the above-mentioned transferred data volume count value to a count value held in second counter 210. That is to say, a data volume stored in memory 207 is same as a count value of counter 210.

Irrespective of whether or not a re-coding process ends, a coding process with two coding units 202 and 205 continues as far as image data from input unit 201 to be coded remains. A determination of whether count value of counter 208 is reaches a set value is repeated until a coding process (coding and re-coding) of image data for a single page input from input unit 201 ends and the above-mentioned coding and re-coding processes are performed under a control according to the determination obtained here.

In summary, for the above-mentioned operations, second coding unit 205 performs coding with a next higher compression ratio to that used in first coding unit 202. When quantity of codes generated at first coding unit 202 reaches a set volume, a quantization parameter for first coding unit 202 is made the same as that for second coding unit 205 immediately before. A quantization parameter for second coding unit 205 is set to a much higher compression ratio. Data within first memory 204 is discarded, and data stored in second memory 207 is transferred to first memory 204, while a value in second counter 210 is written into first counter 208. In order to re-code data in second memory with much higher compression ratio, a quantization parameter for re-coding unit 211 is made the same as a newly set quantization parameter for second coding unit 205. As a result, as data in second memory 207, coded data equivalent to data compressed with a newly set quantization parameter is stored from the top of the page.

In the second embodiment, a mode for coding can be designated at mode designation unit 126. Now, each mode will be described by calling second coding unit 205 "high-compression-ratio encoder" and first coding unit 202 "low-compression-ratio encoder", for the second coding unit 205 always performs coding with higher compression ratio than that of first coding unit 202.

In the second embodiment, as an operation mode, which can be designated at mode designation unit 126 and involves in a quantization operation error for DCT components, there are four modes as shown in FIG. 27; image quality preferred, compression ratio preferred, edge emphasis (higher) and edge emphasis (lower). (what shown in FIG. 18 can be used for the second embodiment, or what shown in FIG. 27 can be used for the first embodiment).

[Image Quality Preferred]

In the initial stage, round-off is selected for both of low-compression-ratio encoder and high-compression-ratio encoder. Cut-off is selected for the first, second and later times of re-coding.

[Compression Ratio Preferred]

In the initial stage, round-off is selected for low-compression-ratio encoder, while cut-off is selected for high-compression-ratio encoder. Cut-off is selected for the first, second and later times of re-coding.

[Edge Emphasis (Higher)]

In the initial stage, round-off is selected for low-compression-ratio encoder, while conditional round-up is selected for high-compression-ratio encoder (condition itself is the same as that for the first embodiment). Conditional round-up is selected for the first, second and later times of re-coding.

[Edge Emphasis (Lower)]

In the initial stage, round-off is selected for low-compression-ratio encoder, while conditional round-up is selected for high-compression-ratio encoder. Cut-off is selected for the first, second and later times of re-coding.

Figure 12:
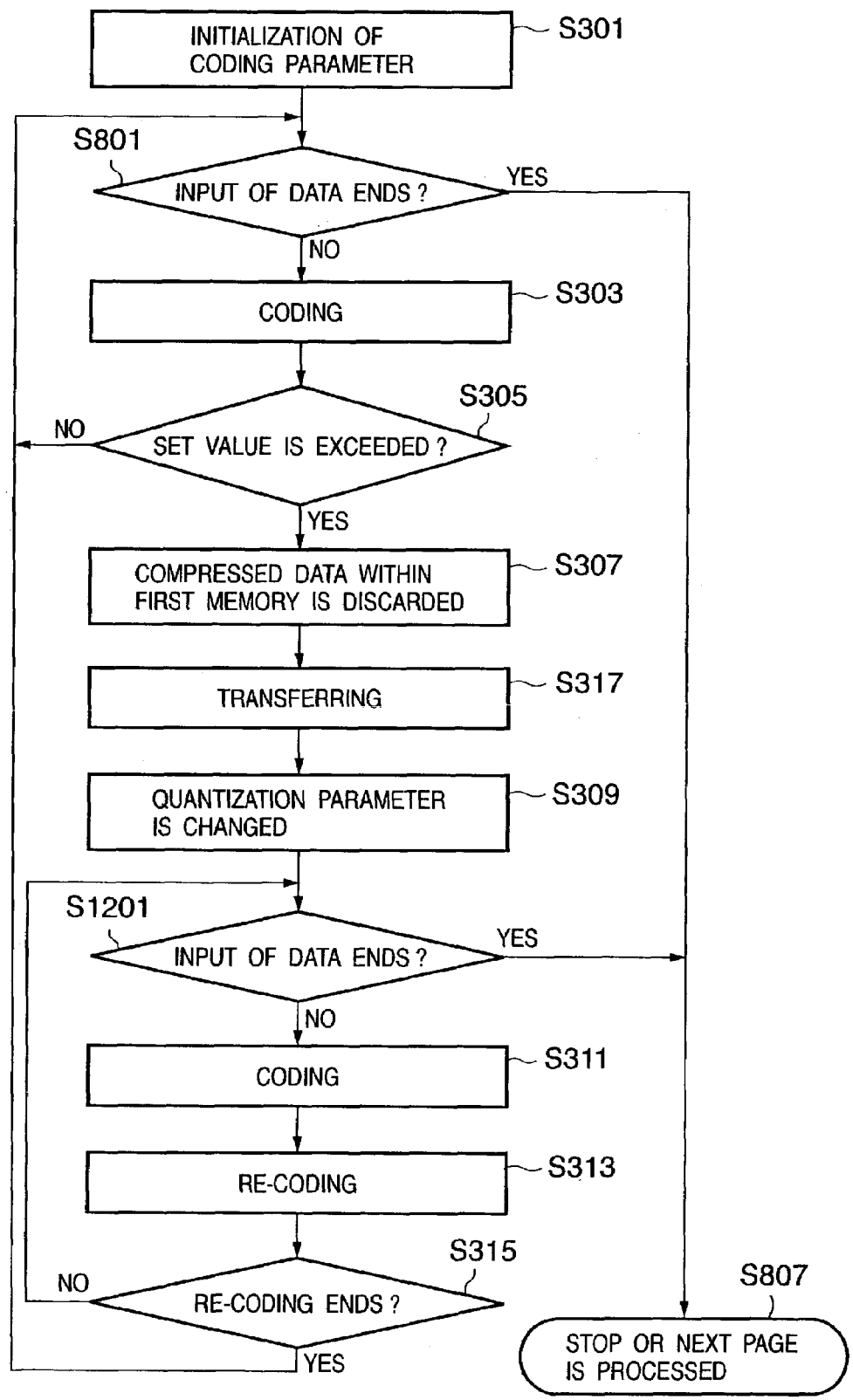
FIG. 12 is a flowchart showing a procedure performed in the configuration shown in FIG. 2.

Next, a flowchart representing a flow of a process in a configuration of the above-mentioned FIG. 2 is described in FIG. 12.

When tow coding units exist as mentioned with reference to FIG. 2, image data for a single page is coded according to a flowchart shown in FIG. 12. FIG. 12 is almost the same as FIG. 8, which is a flowchart in the case of one coding unit. Those skilled in art can fully understand features of the second embodiment from the above description, thus, a procedure shown in FIG. 12 will be described in terms of three phases as in the case of one coding unit, focusing on differences from a procedure shown in FIG. 8.

The biggest difference between the above-mentioned flow shown in FIG. 8 and a flow of this example is that a transfer process at step S317 is performed between steps S307 and S309 in this example. That is to say, it can be considered that a coding and re-coding phase and a transfer phase are exchanged each other (with an exception of a discarding process of coded data at step S307).

For initialization of a coding parameter at step S301, quantization parameter Q1 is set to first coding unit 202, and quantization parameter Q2 is set to second coding unit 205. A quantization step represented by quantization parameter Q2 is bigger than one represented by Q1. An operation mode is decided according to a scenario designated at mode designation unit 126.

Figure 13:
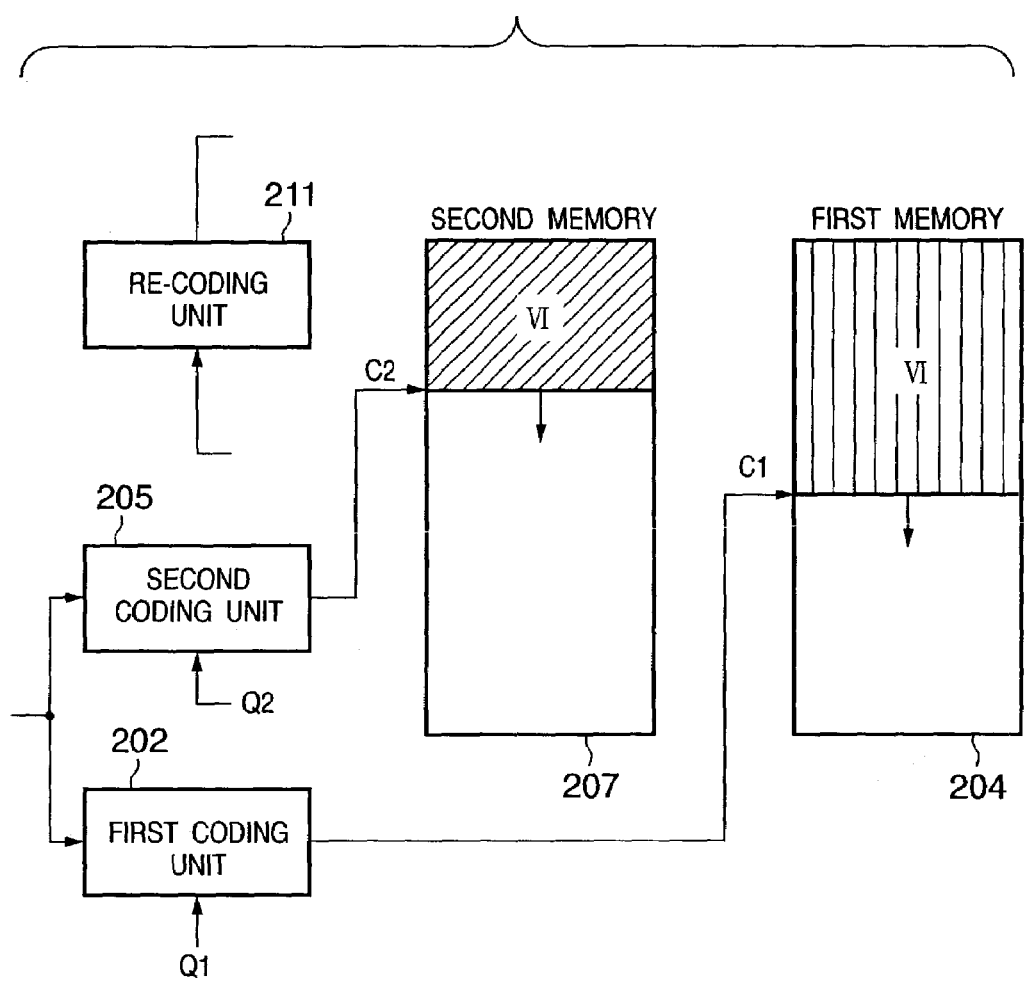
FIG. 13 is a diagram showing a data flow and contents of a memory in a coding phase of an initial state occurring in the configuration shown in FIG. 2.

In coding phase, steps S801, S303, and S305 are repeatedly performed. Steps S801 and S305 are the same process as that in the case of one coding unit, while a coding process at step S303 is different from that in the case as shown in FIG. 13.

Data coded with quantization parameter Q1 of the lowest compression-ratio is stored as coded data to be stored at first, while data coded with quantization parameter Q2 is stored as coded data to be stored into second memory in order to make a compression ratio of coded data to be stored in first memory 204 higher in stages.

Figure 14:
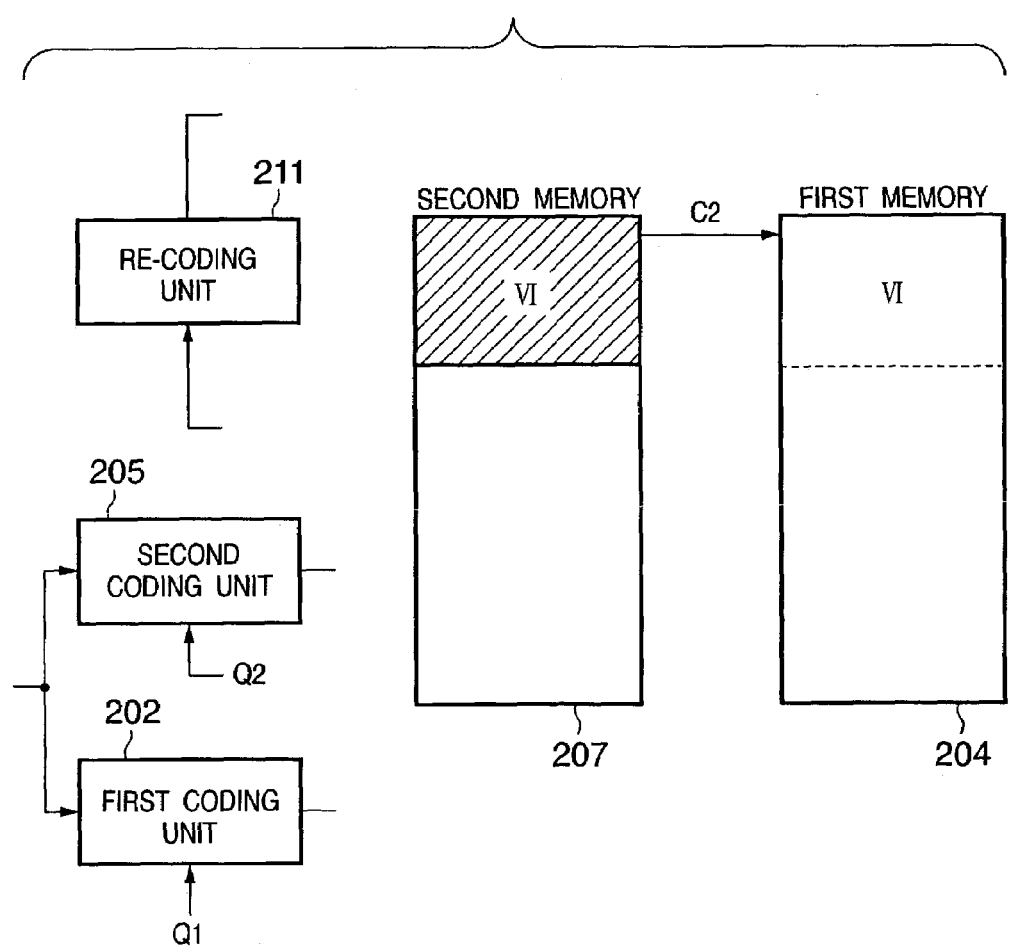
FIG. 14 is a diagram showing a data flow and contents of a memory in a transfer phase in the configuration shown in FIG. 2.

When a data volume stored in first memory 204 exceeds a set upper limit value (step S305), coded data held in first memory 204 is discarded immediately (step S307) and coded data of higher compression ratio held in second memory 207 is transferred to first memory 204 (see step S317 in FIG. 14). In this manner, coded data of appropriate second candidate, which does not exceeds the upper limit value, can be immediately stored in first memory 207 before the completion of a first re-coding process described in the first embodiment. This is the biggest advantage of the application of FIG. 2, which has tow encoders, over FIG. 1.

In the second embodiment, it is considered to be useless to keep coded data with the same compression ratio both in two memories 204 and 207. Thus, coded data with compression ratio higher than that for coded data stored in first memory 204 is stored in second memory 207. Accordingly, following processes are to be performed on the basis of this concept; when a transferring process (transfer phase) of coded data in second memory 207 to first memory 204 ends, coded data of second memory 207 is re-coded to hold data coded with the next higher compression ratio.

Figure 15:
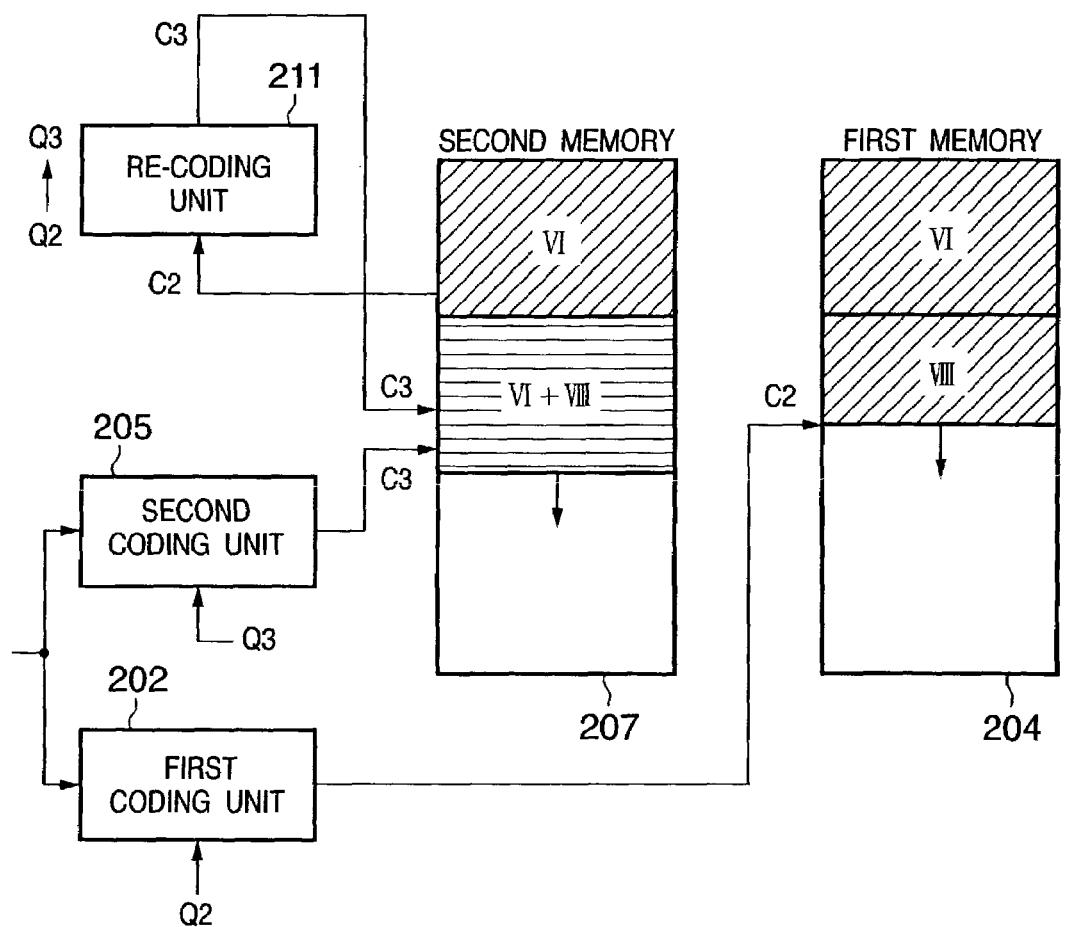
FIG. 15 is a diagram showing a data flow and contents of a memory in a coding and re-coding phase in the configuration shown in FIG. 2.

More specifically, in coding and re-coding phase next to a transfer phase, each of quantization parameters Q1 and Q2 to be applied to each of two coding units 202 and 205 is changed to each of Q2 and Q3 (step S309), and if image data for a single page keeps on being input (step S803), the input data is coded at two coding units with a new quantization step set for following image data (step S311) and stored into each of memories 204 and 207 before the above-mentioned re-coding as shown in FIG. 15. In parallel with the above-mentioned coding process, for coded data stored in second memory (what is transferred to first memory 204), a re-coding process is performed (S313) to obtain data coded by means of quantization parameter Q3 at re-coding unit 211 and store the re-coded data into second memory 207 again so that the coded data stored in second memory is changed into data coded with next higher compression ratio to coded data in first memory.

In the second embodiment, a re-coding process is accomplished by performing a bit-shift process on each quantization value after coded data is Huffman decoded, which leads the same result as that obtained from the quantization value divided by $2^n$, and then performing Huffman coding again as in the first embodiment. A high-speed re-coding process can be performed because only a bit shift process changes a quantization step, and because neither inverse-orthogonal transform nor re-orthogonal transform is performed in this method.

When there are two coding units as in the second example, second memory 207 stores coded data and re-coded data mixed as shown in FIG. 15. Therefore, it is also required for second memory 207 to divide coded data into specific units to be managed as a file or a packet. To fulfill the requirement, the same configuration as that of an alteration for the first embodiment, for example, is preferably provided.

Figure 16:
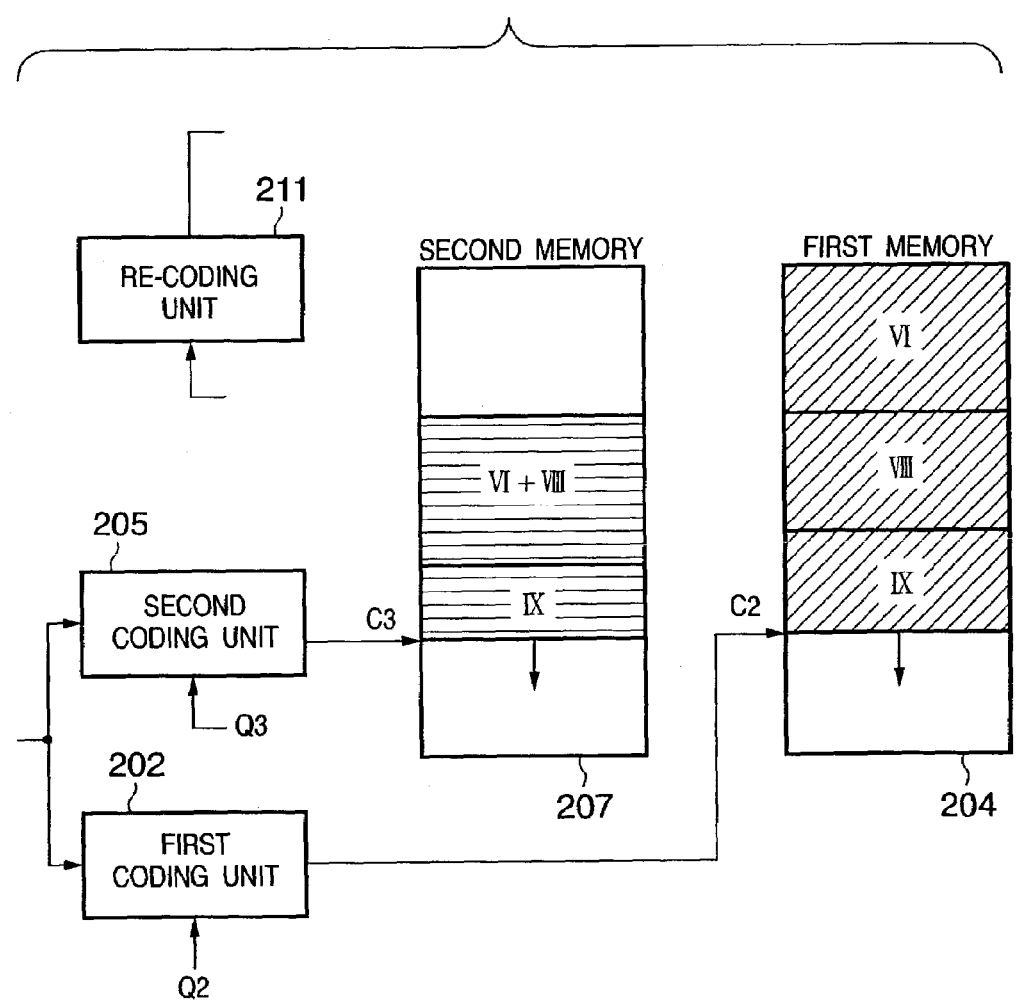
FIG. 16 is a diagram showing a data flow and contents of a memory in a coding phase after a coding and re-coding phase in the configuration shown in FIG. 2.

In FIG. 12, when it is determined that a re-coding process ends at step S315, the process transfers to coding phase again (steps S801 and S303). In coding phase after a coding and re-coding phase, pieces of coded data held in two memories 204 and 207 are different not only in compression ratio but also, to a great extent, in the way they are mixed (address) as shown in FIG. 16. Therefore, when a data volume of first memory 204 exceeds a set value again, coded data held in second memory 207 (codes in areas indicated by horizontal stripes of VI+VIII) should be transferred to first memory 204. In consideration of these points, coded data should be managed as a file or as a packet also in first memory 204 as in second memory 207. This requires a management facility, which uses the above-mentioned management table, also in first memory 204.

A state of coding phase shown in FIG. 16 is the same as that of coding phase in an initial state (FIG. 13) except that the way quantization parameters and pieces of coded data are mixed differs between before and after a re-coding process. Therefore, by repeating a coding phase, a transfer phase, and a coding and re-coding phase, coded data, which is image data for a single page finally compressed to a volume less than a set upper limit value, can be surely stored into first memory 204.

In this second example, a transfer phase and a coding and re-coding phase are placed in the reverse order of that in the first embodiment. Thus, determination of whether or not input of image data for a single page, which is performed after a transfer process in FIG. 8, ends (step S805) is performed almost at the same time of determination of whether or not input of image data for a single page ends in a coding and re-coding phase (step S803). These two determinations are the same as step S805 in function and the same as step S803 in timing. Therefore, these two steps are combined into a single step for determining whether or not image data for a new single page ends, which is represented as step S1201.

In the first and second embodiments described above, first memory and second memory are described physically separated. The reason is that this configuration is advantageous because two memories can be accessed separately, which characterizes the present invention. However, a case that first memory and second memory are not physically separated is also included in the scope of the present invention. It is understood that the present invention can be implemented on a single memory, when the description above is applied to a case that two areas corresponding to the first memory and the second memory are reserved on a physically one memory, with the first memory replaced with a first memory area and the second memory with a second memory area.

When each of the above-mentioned examples is embodied on one memory, some of the data transferring processes described in the transfer phase are eliminated. As details of such elimination can be easily imagined for each case, a description of each case is omitted. When the two areas are clearly separated and used, the same data transfer process should be performed as in the case of physically two memories. On the other hand, if a piece of data is shared between the two areas, a data transfer process can be eliminated and memory is reduced as well.

For example, an effect of transferring coded data held in second memory area to first memory area can be obtained by just transferring two pieces of information on a top address where the coded data is stored and a data size from second memory control unit to first memory control unit instead of transferring the coded data.

When the coded data is stored in file or packet, amount of information transferred between the memory control units slightly increases, which requires management table information on the coded data to be transferred. However, it is still efficient than transferring coded data.

<Description of Application>

Figure 17:
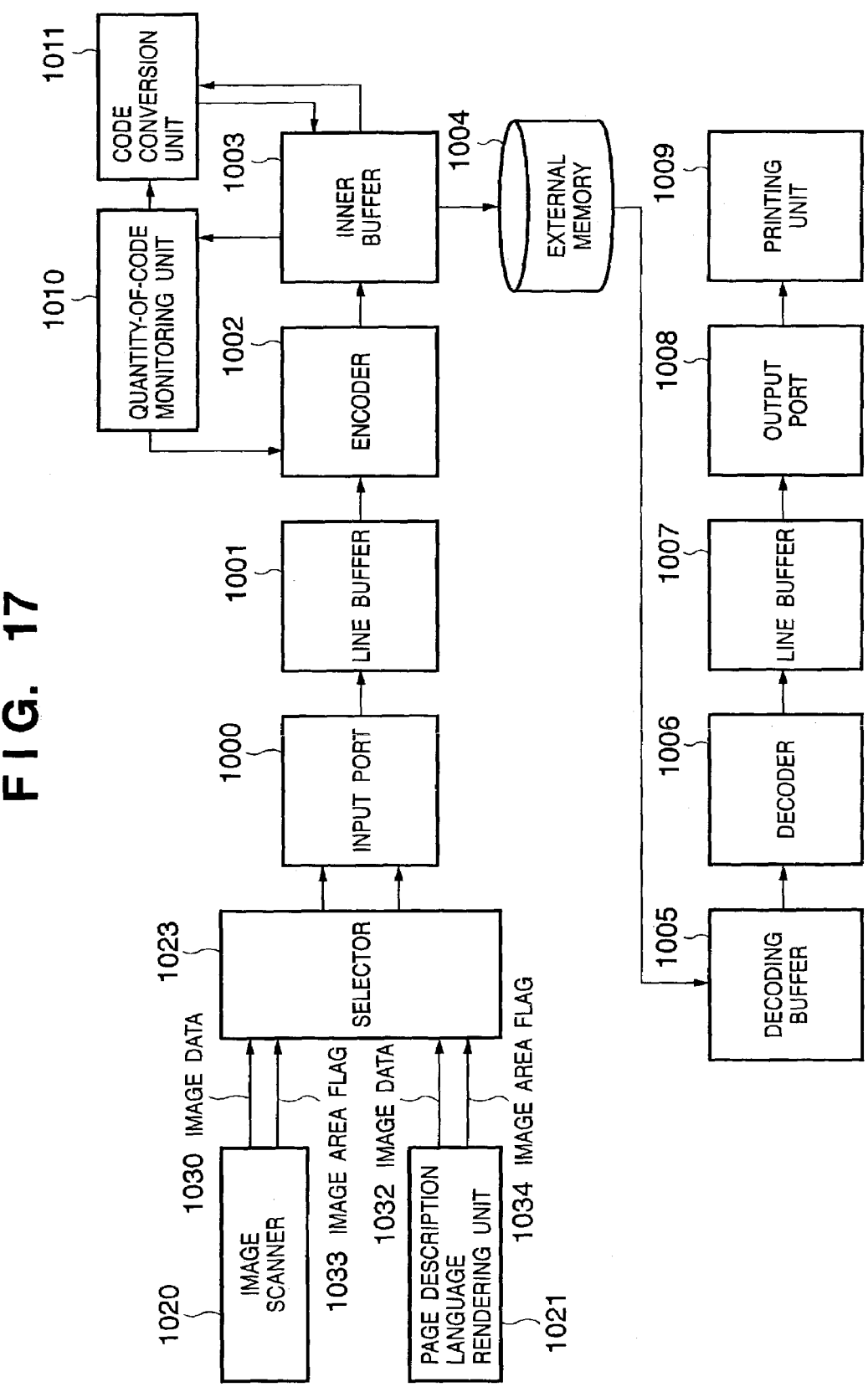
FIG. 17 is a configuration chart showing a digital copying machine to which an embodiment is applied.

FIG. 17 is a block diagram of a digital image processing apparatus to which the embodiment is applied.

In FIG. 17, reference numeral 1000 denotes an input port for a color image (image area information and color image data). Selector 1023 for selecting one of image scanner 1020 and rendering engine 1021 based on print data output from a host computer is connected to input port 1000 (selection is performed on an operation panel, which is not shown, or one, to which an input is done, is automatically selected). Pieces of color image data 1030 and 1032 and pieces of image area information (identifying information on whether a pixel is in an area for character and line drawing or a gray-scale area and whether a pixel is color or monochrome for each pixel) 1033 and 1034 are output from each one of image scanner 1020 and rendering engine 1021. In rendering engine 1021, image area information is generated on the basis of print data (because data is transferred from a host computer as image data in the case of gray-scale image, and the generation bases on a drawing command in the case of character line drawing). On the other hand, in image scanner unit 1020, it is basically required to read an image on a sheet of paper, and determine whether it is character line drawing area or gray-scale area, and whether it color or monochrome on the basis-of the read image. Therefore, it is considered that a circuit for generating this image area information is included in the device of the embodiment.

Reference numeral 1001 denotes a line buffer having multiple lines for an input image (an enough capacity for extracting a tile described below). Reference numeral 1002 denotes a color image encoder, which corresponds to coding unit 102 shown in FIG. 1 and coding unit 202 shown in FIG. 2. Color image encoder 1002 of the embodiment is considered to include a conversion circuit, which temporarily converts an input color image into a brightness signal and a color-difference signal. And the data after the conversion is compressed and coded. As a brightness signal and a color-difference signal, a color space is used, which is represented by Y, Cr, Cb, etc., though YIQ may be used. Accordingly, in the embodiment, a brightness signal is represented by Y, a color-difference signal by C1 and C2 for convenience.

Reference numeral 1003 denotes an external memory for storing a coded color image (e.g., hard disk). Reference numeral 1005 denotes a decoding buffer for temporarily storing coded image data read from external memory 1004 for decoding, and reference numeral 1006 denotes a decoder. Reference numeral 1007 denotes a line buffer for temporarily storing the decoded image. Reference numeral 1008 denotes an output port for outputting an image stored in line buffer 1008 to printing unit 1009 connected thereto. Printing unit 1009 is considered to be provided with a conversion circuit for converting data of Y, C1, C2 into recording color components of Y, M, C (or Y, M, C, Bk). Printing unit 1009 can use any recording method including a laser beam printer, a printer, which discharges droplets of ink, and the like.

Reference numeral 1010 denotes quantity-of-codes monitoring unit for monitoring a coded data volume to be stored in inner buffer 1003, and reference numeral 1011 denotes a code conversion unit for re-coding.

As compared with FIG. 1, inner buffer 1003 in FIG. 17 serves as first memory and second memory in FIG. 1. Coded sequence control unit 108, first counter 107, second counter 110, and selector 111 correspond to quantity-of-codes monitoring unit 1010, while re-coding unit 109 corresponds to code conversion unit 1011.

In color image coding unit 1002, image data stored in line buffer 1001 is divided into tiles in size of 8×8 pixel (each tile may be in size of M×M pixel, without limited to 8×8), and color information is coded for each 8×8 pixel. A color image is coded with discrete cosine transform (JPEG), and image area information is coded with run-length coding, respectively.

Image area information accompanies each pixel, though in the case that each block of 8×8 is processed with DCT as in the embodiment, an image area flag representing the information is used in each block. An image area is divided into a character area and a photograph area of an image or into color or monochrome as mentioned above, though an image area can be divided according to another scheme or other components can be added to the above-mentioned way of division.

Quantity-of-codes monitoring unit 1010 monitors quantity of codes generated by encoder 1002. When the quantity is expected to exceed a set volume, quantity-of-codes monitoring unit 1010 adjusts encoder 1002 to perform higher coding on color image data (and attribute information) input afterwards, and performs higher coding on previously coded data by making code converter 1011 perform re-coding. Mode designation unit described in the first and second embodiments is provided to an operation unit, which is not shown, where a process is performed according to a designated scenario.

Figure 19:
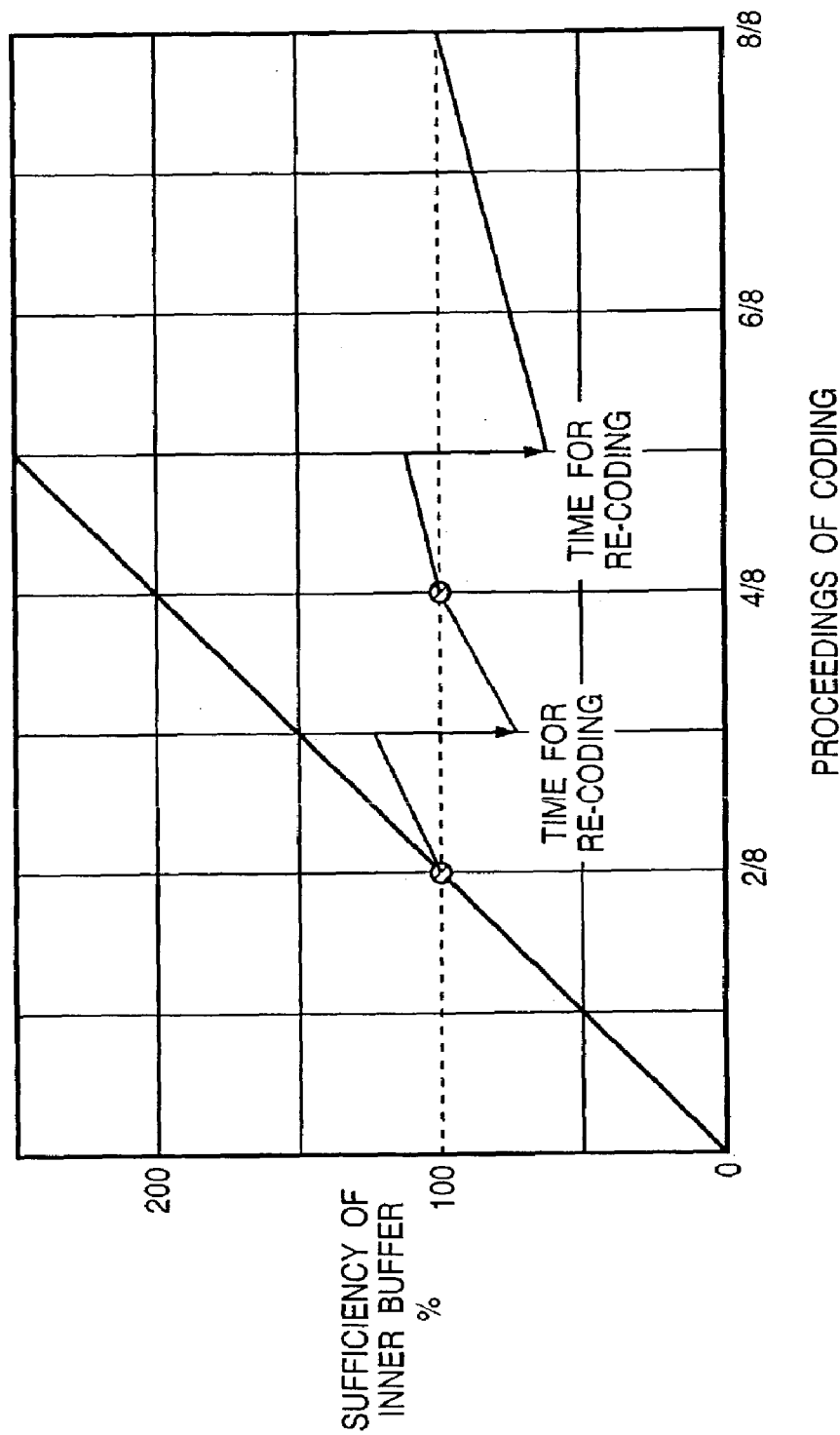
FIG. 19 is a graph showing an exemplary transition of sufficiency ratio of an inner buffer during a coding process.

FIG. 19 is an illustration of relationship between proceedings of coding and memory sufficiency. Next, an operation sequence will be briefly described with reference to FIG. 19.

FIG. 19 indicates that a coded data volume is overflowed at 2/8 according to a condition of an initial-value (a quantization parameter in an initial stage).

It is also indicated that re-coding before a determination of exceeding of a target value is completed, and a transfer process to first memory 104 is complete at 3/8.

Re-coding process starts at 4/8, for the coded data volume is overflowed there again. As the coded data volume is overflowed for the second time, a quantization parameter (an operation mode) for the second time according to designated scenario is set. It is indicated that this re-coding ends and a transfer process is completed at 5/8. It is indicated that coding of one page is completed at 8/8.

Although memory is overrun by 25% at 3/8 in the above-mentioned example, the overrun depends on a compression ratio and time for re-coding. In an actual device, memory, which is moderate in size, has to be reserved as a design parameter to make an allowance for a buffer memory. The processing completes within a time period for coding a sheet of image as it is apparent from the figure.

Figure 20A:
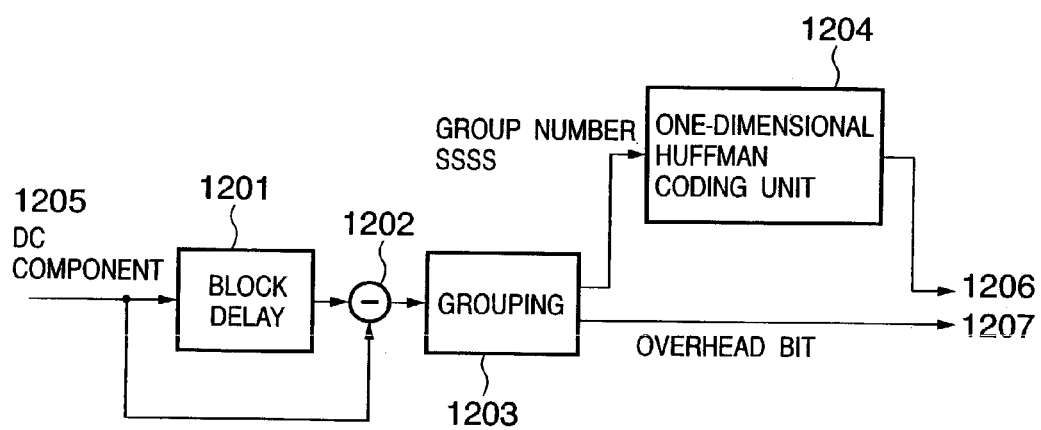

FIGS. 20A to 20D are illustrations of conversion of a direct current component (DC component) of DCT components. FIG. 20B is an illustration of coding of DC component. A difference between a DC component value after DCT conversion of 8×8 (a left top small square in the figure) and a DC component value of an adjacent block is calculated to be variable-length coded.

FIG. 20A is a block diagram for coding. In this figure, a difference between a DC component 1205 and a DC component of an immediately preceding block delayed at block delay generator 1201 is calculated at difference calculator 1202. The difference is converted into a group number SSSS by a grouping process.

At a grouping unit, the number of overhead bits is determined according to DC difference as shown in FIG. 20C. The group number SSSS is Huffman coded according to a table shown in FIG. 20D at one-dimensional Huffman coding unit 1204.

It can be apparent from the figures that the smaller the group number, the smaller the number of Huffman codes and the number of overhead bits (in some cases, the numbers may be the same).

Therefore, when a DC difference becomes 1/2, the group number is decremented by one, with a variable-length coding part, which is the sum of Huffman coding and an overhead bit, being shorter by one to two bits.

FIG. 21 is an illustration of a coding method of an alternating current (AC) components of DCT components.

AC components 1301 are rearranged in zigzag scan order. Then, if it is determined to be 0 at determination device 1302, the number of continuing components (run length), which are 0 at run-length counter 1303, is counted and run-length NNNN 1306 is output. For a component value other than 0, group number 1307 and overhead bit 1302 are output at grouping device 1304 as in FIG. 20. At two-dimensional Huffman coding device 1305, run length NNNN and group number SSSS are Huffman coded together (see FIG. 23).

If run length NNNN exceeds 15, required numbers of ZRL, which indicates run length 16, are output. For example, run length 35 is converted to ZRL+ZRL+run length 3 and coded.

After the last effectiveness component (factor other than 0), EOB (End of Block) is added.

Figure 22:
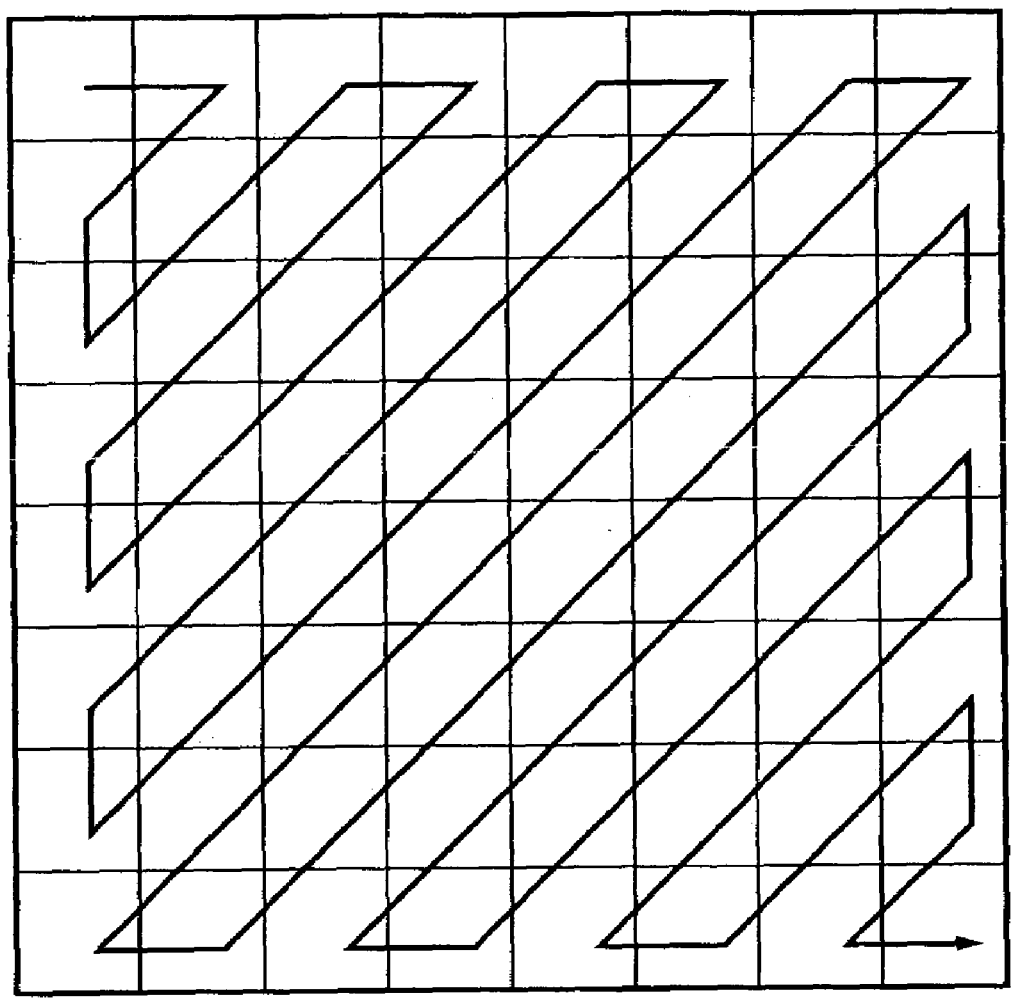
FIG. 22 is a conceptual diagram of a zigzag scan in quantization.

In the embodiment, a DCT process is performed on a block of 8×8, thus, the order to be zigzag scanned is as shown in FIG. 22.

FIG. 24 shows a part of Huffman coding table that is looked up with run length and size.

Therefore, it is apparent that when an AC component value becomes 1/2, the group number is decremented by one, with a variable-length coding part, which is the sum of Huffman coding and overhead bit, being shorter by one to two bits.

Moreover, the component value becomes 0 and run length becomes longer, thus, the number of advantageous symbols to be coded decreases, resulting in further shorter coding length.

Figure 25:
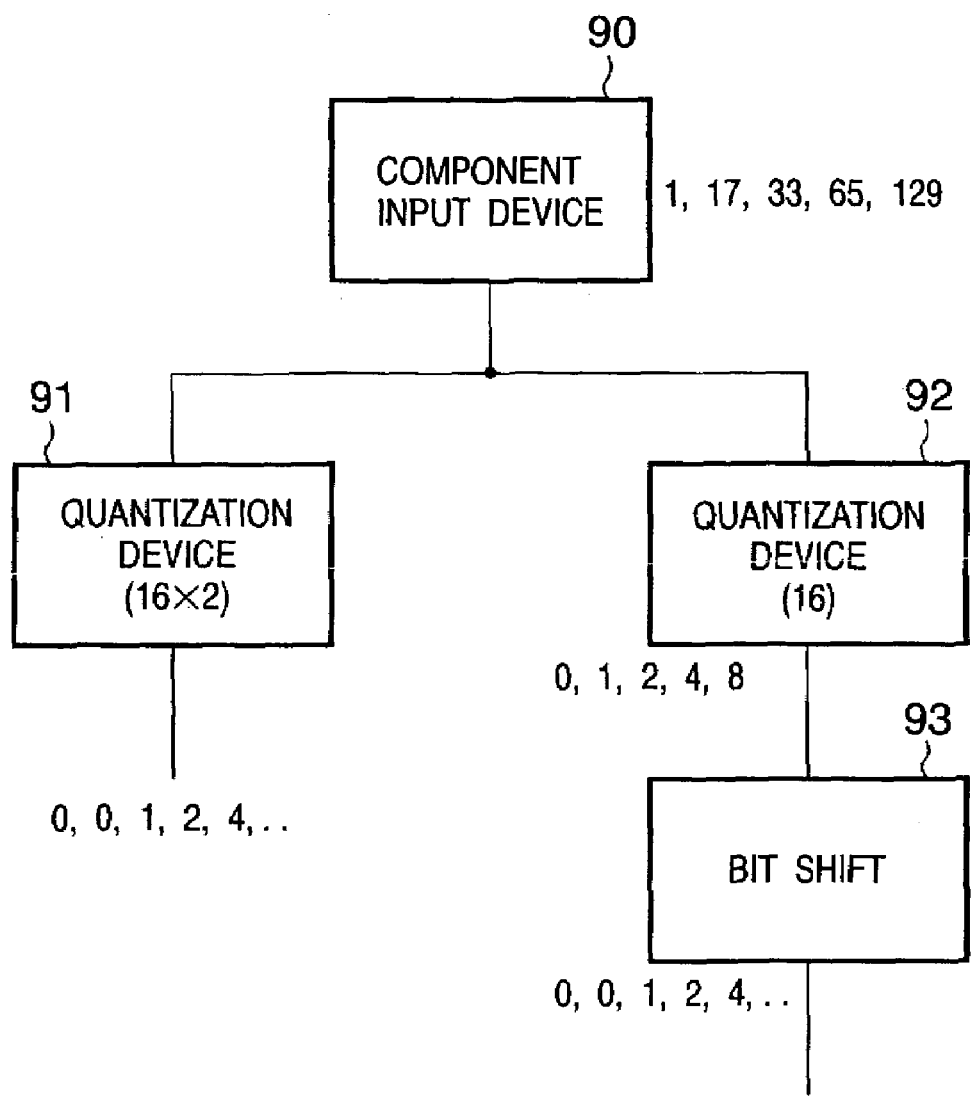
FIG. 25 is a diagram showing a flow of a process of quantization in an application of the embodiment.

FIG. 25 is an illustration showing that a bit shifted component and a doubled quantization step are equivalent. Strictly speaking, it is limited to perform cut-off rather than round-off at quantization.

A sequence of components {1, 17, 33, 65, 129 . . . } is input from component input device 90. At quantization device 91, a sequence of components is divided by the doubled value {32} obtained by 2 times of quantization step {16} and an output sequence {0,0, 1,2,4 . . . } is output as a result. On the other hand, at quantization device 92, a sequence of components is divided by quantization step {16}, an output sequence {0, 1, 2, 4, 8 . . . } is output, and {0, 0, 1, 2, 4 . . . } is output as a result by a right shift of a quantization value at bit shift device 93. That is to say, what quantization step is doubled and what divided by two with a bit shift after quantizations are equivalent. For a negative component value, the same effect can be obtained by processing a sign code and an absolute value separately.

However, if a component is simply cut-off with a level shift, a problem occurs that an image is apt to blur unless an appropriate level shift corrective process is performed.

By changing a component conversion block from a shift process to a conditional round-up process described below, sharpness of an image can be maintained to some extent.

As an example of conditional round-up, there is a method that the process is unchanged for a component value of 0, the process is changed to cut-off for a component value of 1, and the process is changed to round-up for a component value of 2 and more. Rounding up a value means increasing the value to some extent. If a small value is rounded up, an error value resulted from a round-up occupies large part of the value, which will be outstanding noise.

Figure 26:
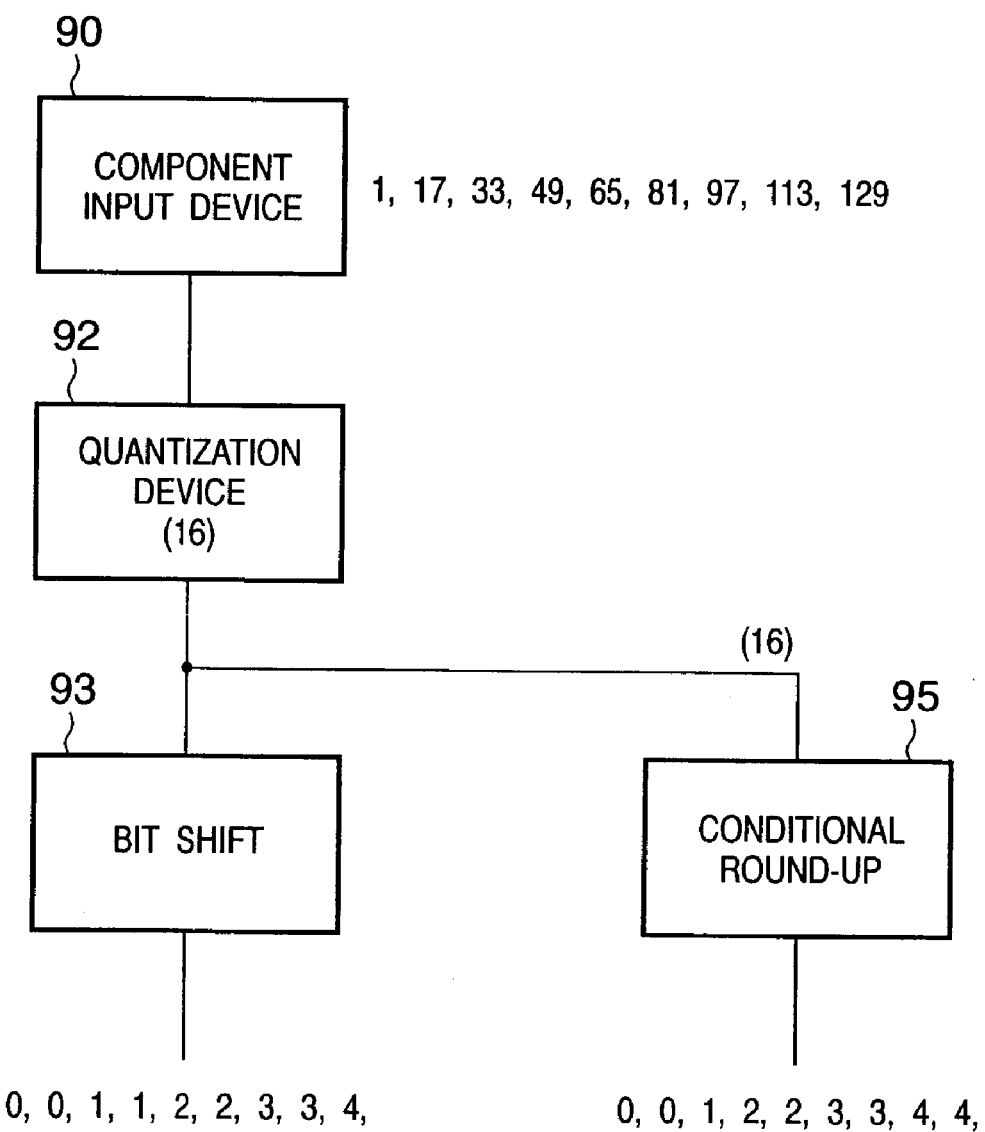
FIG. 26 is a diagram showing a flow of a process after quantization in an application of the embodiment.

FIG. 26 shows a comparison after quantization, where an input {1, 17, 33, 49, 65, 81 97, 113, 129} is processed through bit shift circuit 93 for a shift process, {0,0,1,1,2,2, 3,3,4} is output, while the input is processed through conditional round-up device 95, the output is changed to {0,0, 1,2,2,3,3,4,4}.

That is to say, the conversion is changed to one that amplitude of a wavelength is emphasized big, which contributes to maintain sharpness of an image to some extent.

As mentioned above, according to the first and second embodiments and their applications, even when the target value is reached during compression coding of an image data, which is being input, a compression ratio can be set to much higher while the input continues, so that pieces of coded data within a target value can be finally obtained. Even in a case where a target value is reached or exceeded, a re-quantization method that puts image quality before reduction of quantity of codes is used in a stage with a small number of re-coding. As the number of re-coding increases, quantity of codes and image quality can be equally controlled by reducing more quantity of codes.

<Description of other Applications>

Figure 28:
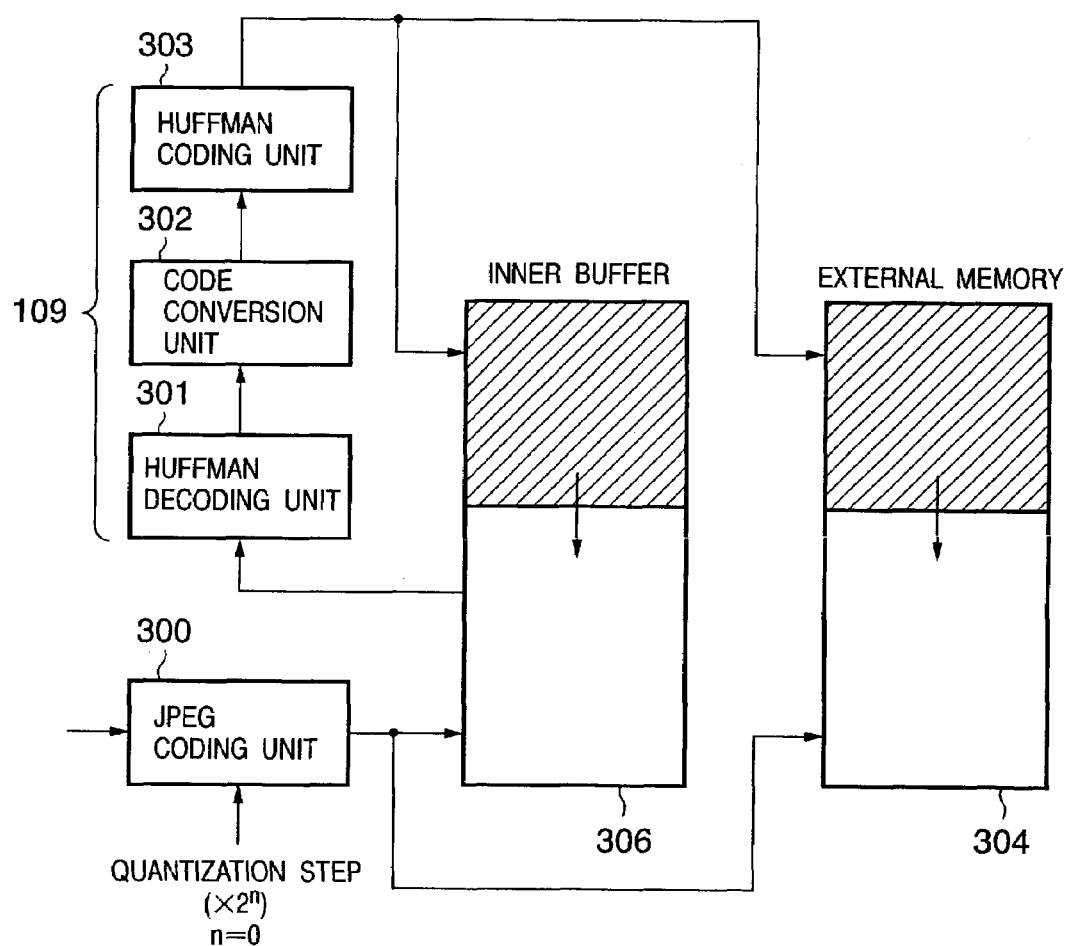
FIG. 28 is a block diagram of a device in another application of the embodiment.

FIG. 28 is a schematic diagram showing a configuration. As processes thereof are the same as those of the first embodiment described above, the processes will be briefly described below.

JPEG coding unit 300 (corresponding to coding unit 102 in FIG. 1) performs DCT conversion on input image data, quantizes the obtained DCT components with set quantization step (=2n, for initial state, n=0), performs a Huffman coding process and stores the result into an external memory 304 (corresponding to first memory 104 in FIG. 1) such as a hard disk and an internal buffer 306 (corresponding to second memory 106 in FIG. 1) consisting of a RAM for high-speed reading/writing.

A data volume being stored in external memory 304 is monitored here. When the volume reaches (or exceeds) the preset value, data in external memory 304 is discarded and a quantization step doubled a prior quantization step (n<−n+1) is set in JPEG coding unit 300, so that the coding continues. At this moment, as data in external memory 304 is discarded, starting from the middle of a page, pieces of data compression-coded according to a newly set quantization step are stored into external memory 304 one after another, with pieces of data before the middle of the page being saved in inner buffer 306. Symbols before Huffman coding are also decoded by decoding the data before the middle of the page saved in inner buffer 306 at Huffman decoder 301. Then the least significant bit is deleted by code conversion unit 302 (right shifted by one bit and divided by two), a re-coding process is performed by Huffman coding unit 303, and the result is stored into inner buffer 306 and external memory 304.

When a set value is reached again afterwards, a quantization step is set at much bigger value and the above-mentioned process is repeated.

Figure 29:
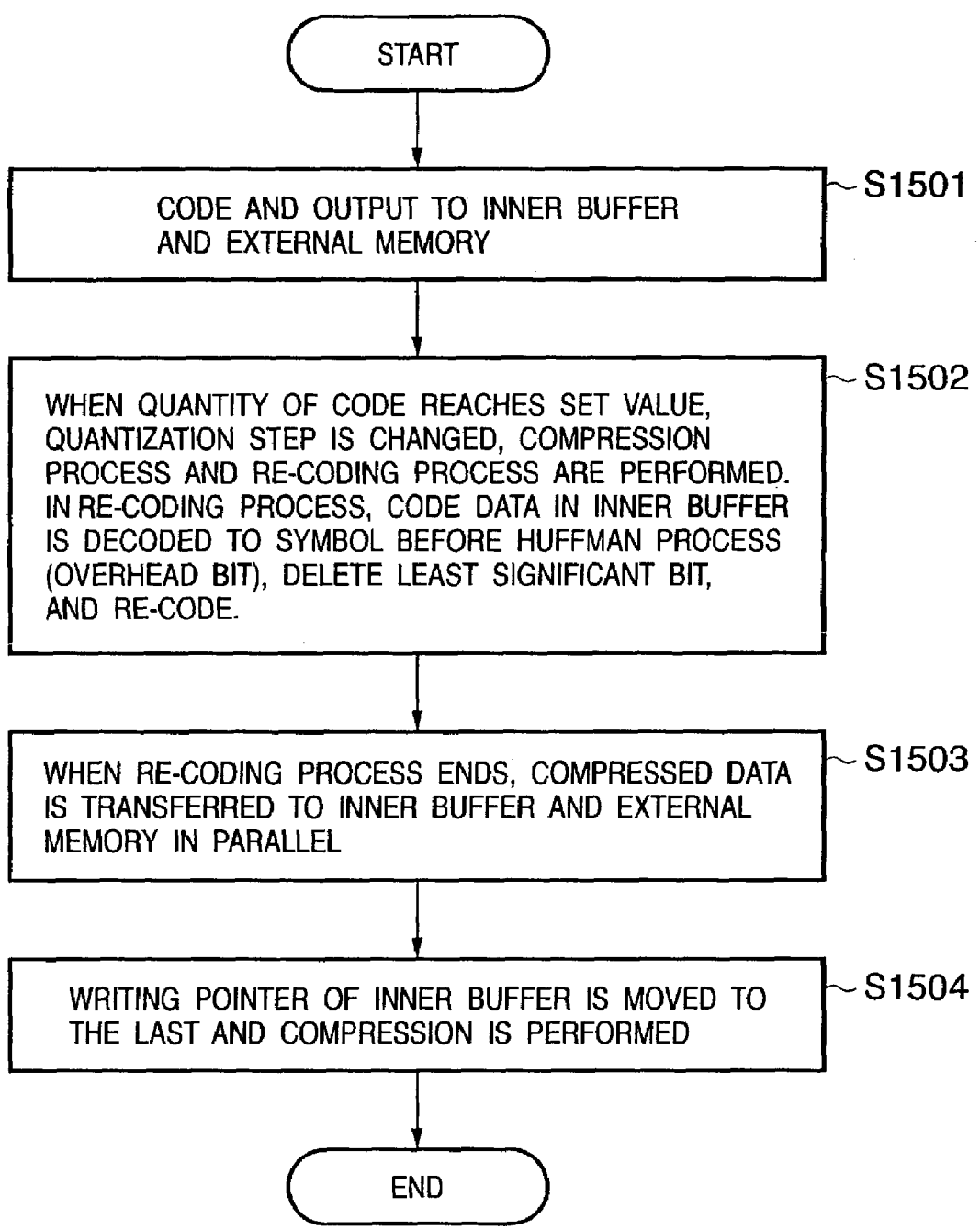
FIG. 29 is a flowchart showing an operation procedure in another application of the embodiment.

Considering that Configuration of devices of the application is the same as that of FIG. 17, description of the configuration is omitted, while a procedure will be described with reference to a flowchart in FIG. 29.

Figure 30:
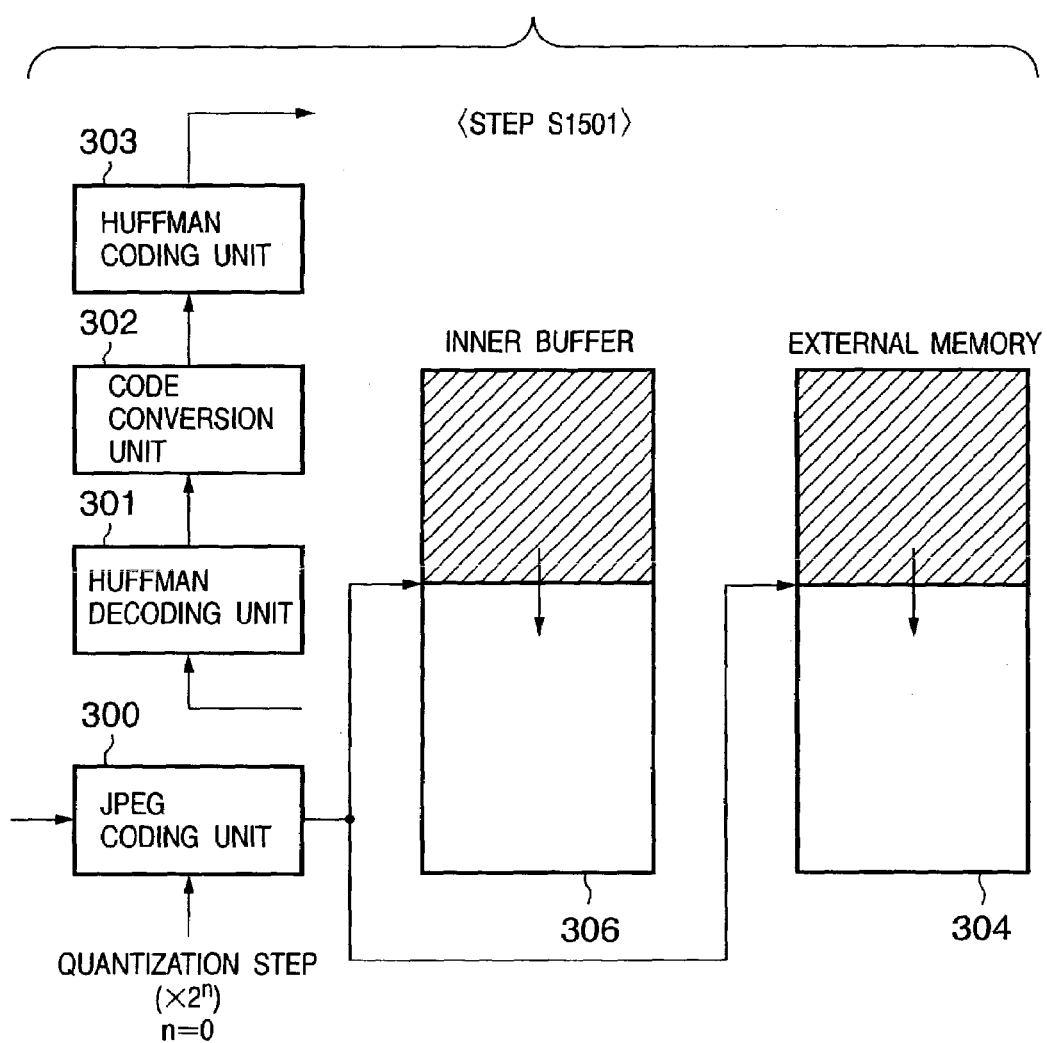
FIG. 30 is a diagram showing a description of another operation with a device during a process in another application of the embodiment.

At step S1501, image data is coded and the coded data is output to each of buffer memory and external memory. This state is shown in FIG. 30, where coded data is stored into both of inner buffer and external memory.

Figure 31:
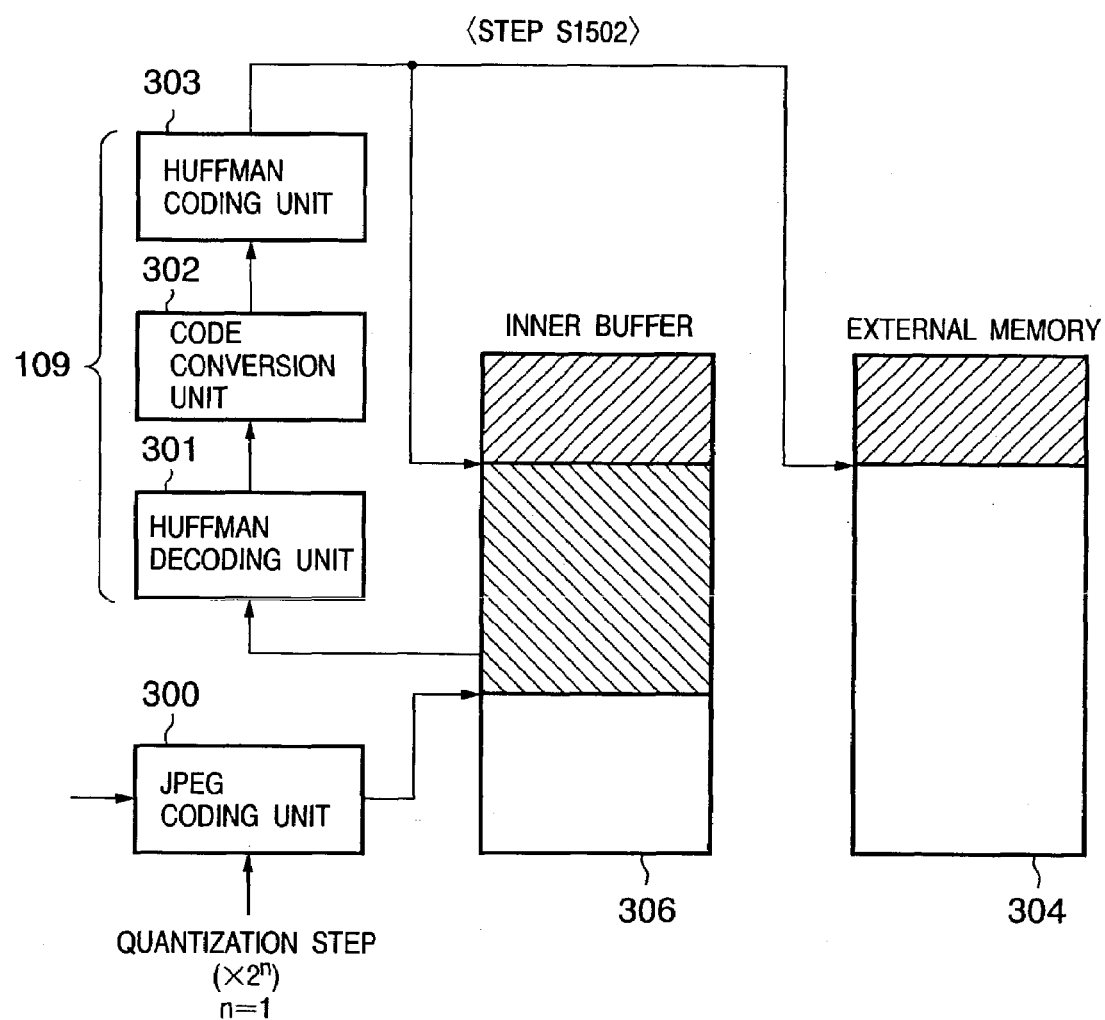
FIG. 31 is a diagram showing a description of another operation with a device during a process in another application of the embodiment.

When quantity of codes is determined to reach a set value at step S1502, data in external memory 304 is discarded, a quantization step is changed, and a compression process and a re-compression process are performed. In the re-coding process, coded data in an inner buffer is decoded to a symbol before a Huffman process, the least significant bit thereof is deleted (bit shifted toward the least significant bit by one), and re-coding is performed. This state is shown in FIG. 31.

Figure 32:
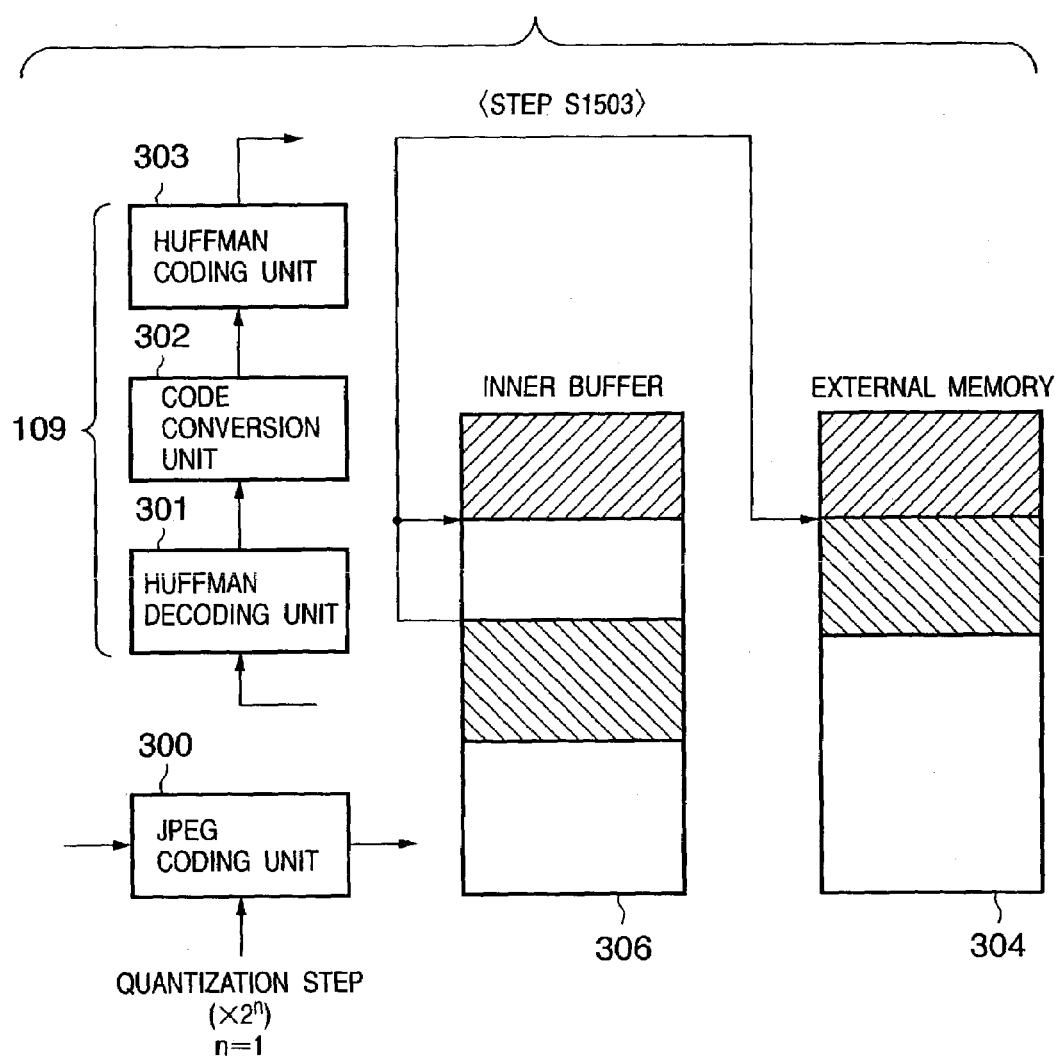
FIG. 32 is a diagram showing a description of another operation with a device during a process in another application of the embodiment.

At step S1503, the data obtained from re-coding is transferred to an inner buffer and an external memory. This state is shown in FIG. 32.

Figure 33:
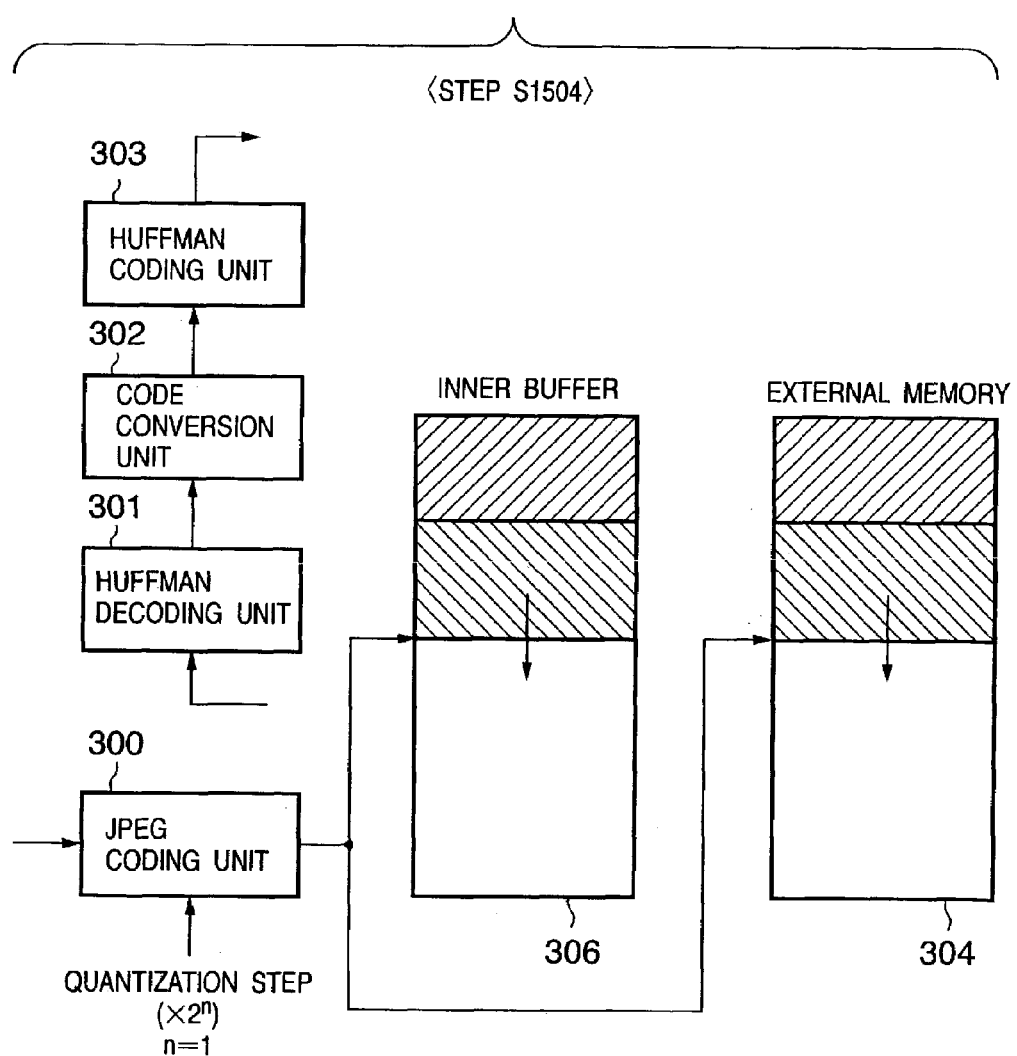
FIG. 33 is a diagram showing a description of another operation with a device during a process in another application of the embodiment.

After the transfer, at step S1504, a storage location for coded data is updated by moving a written location to an inner buffer to the last. After the storage location is changed, data coded with an updated quantization step is stored into each of an inner buffer and an external memory as shown in FIG. 33.

If the set value is reached again during the process of step S1504, a quantization step is updated and the above-mentioned processes are repeated. Sufficiency ratio of external memory 304 is transitioned in virtually the same manner as in the above-mentioned FIG. 19 in this case. A bit shift in re-coding is also the same manner as in the above-mentioned FIG. 26, thus, the descriptions for them are omitted.

Figure 34:
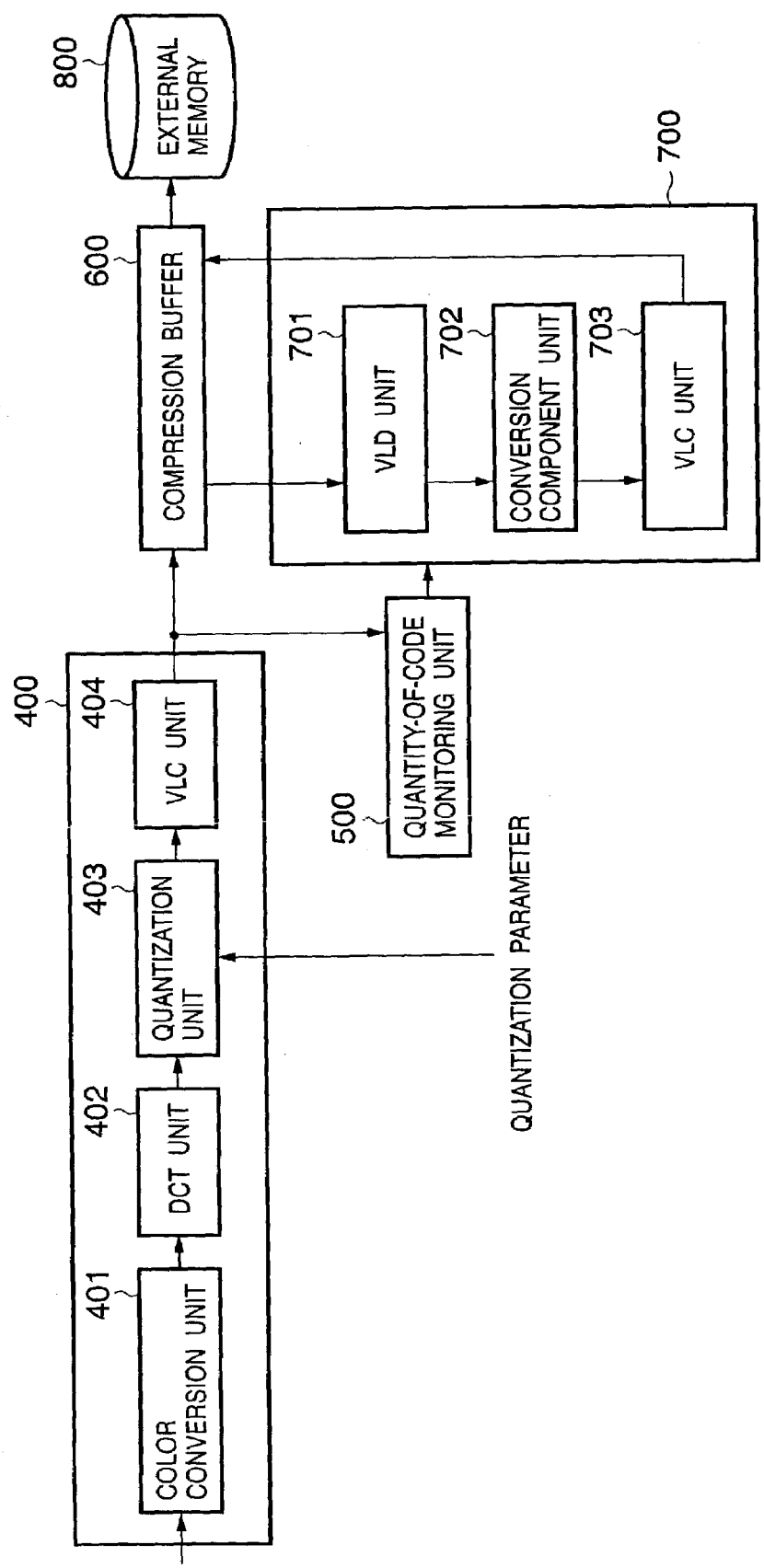
FIG. 34 is a diagram showing a detailed configuration of a device in another application of the embodiment.

FIG. 34 shows a detailed application. Now, the operation will be summarized.

Coding unit 400 corresponds to JPEG coding unit 300. In the case of color signals, red (R), green (G), and blue (B) (considered to be 8 bits each) are converted to brightness and color difference signals Y, Cb, and Cr at color conversion unit in coding unit 400. Each of the converted brightness and color difference signals is converted into a space frequency component at DCT (discrete cosine transform) unit 402. Then, quantization on the basis of a quantization parameter according to contents designated by a control unit (not shown) and the like, is performed at quantization unit 403. Data after quantization is compression-coded at variable-length coding unit (VLC) 404 and stored in compression buffer 600.

Quantity-of-codes monitoring unit 500 monitors a coded data volume output from VLC 404. Then, when the data volume is determined to reach or exceed a volume set previously (set value) (which will be referred to an "overflow" hereinafter), a quantization parameter is updated and quantization device 403 is set again. When the data volume is overflowed again, data previously coded at re-coding device 700 is re-coded. For this reason, previous coded data is decoded to data before coding (quantized component data) at variable-length decoder (VLD) 701. In response to this result, component conversion device 702 reduces component data to smaller value by performing level shifting.

Then, VLC 703 performs coding again and returns the result to compression buffer 600. In this manner, compression data for an image of a single page is finally generated in compression buffer 600. Then the data is output to external memory 800.

In the above-mentioned embodiment, a device for reading an image out from an image scanner is exemplified, and its functional operation is described. Almost all of the functions (including a coding process) can be implemented with a computer program as mentioned above.

Therefore, the present invention can be applied to an application program operating on a general information processing apparatus such as a personal computer. When the present invention is applied to an application program, it is preferable to provide a GUI allowing a user to perform many things as to designate an image file to be compressed, in parallel with to select a target size. The target value can be set by a user to any value. As the setting with numerical value is too complicated, the setting is preferably decided by allowing a user to select from an intuitive menu incorporating size of sheet and image quality (e.g., high, medium, and low).

Two of a quantization step and an operation mode to be used in quantization are described as a coding parameter, though other parameters can be used as far as image quality is made agree among pieces of data of different compression ratios, if such pieces of data mixed. In order to make data to be re-coded from re-coding device 109 be virtually the same as coded data from coding device 102 after changing a parameter, for example, it is preferable to adopt a method of increasing a quantization step as mentioned above.

In the embodiment, an example where a color image is compression coded as brightness and color difference data is described, though a color space representing a color component is not limited to brightness and color difference. La*b* color space, for example, can be used.

A compression parameter is changed for each time the memory over occurs. As a compression parameter to be changed, a quantization step is preferably increased, with placing a color component, which is hard to be discriminated by human eyes. Therefore, it is preferable to adopt a color space appropriate for characteristics of human sight, such as brightness, color difference (hue, color saturation) rather than RGB color space.

As the present invention can be implemented with an application program operating on a general device as mentioned above, the present invention includes a computer program. As a computer program is usually executed after copied or installed by setting a storage medium such as floppy disk or CDROM in a device, such a storage medium is also included within the scope of the present invention as matter of course.

In the present invention, image data is described to be input from a scanner, though the present invention can be applied to a printer driver operating on a host computer. When the present invention is applied to a printer driver, data to be printed can be determined whether it is a gray scale image or a character/line drawing when the data is received from a host process (e.g., application), thus a configuration involved in a image area information generating process can be omitted or simplified.

The present invention can be also applied to a combination of a computer program and an appropriate hardware (e.g., coding circuit).

As mentioned above, according to the present invention, when an image is coded, the image is can be coded within a target size, with a mode reflecting a user's intention for coding, without needing the image to be input again.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for compression coding image data, comprising:
    designating means for designating a mode for a quantization operation;
    first compression coding means wherein a quantization step and a parameter involved in a quantization operation can be changed;
    second compression coding means for decoding and re-compressing code data compressed by said first compression coding means wherein a quantization step and a parameter involved in a quantization operation can be changed;
    quantity-of-codes monitoring means for monitoring a quantity of code data generated with said first compression coding means and determining whether the quantity of code data reaches a predetermined volume or not;
    parameter setting means for making said quantization step the step on the next stage, in parallel by setting a parameter in said first and second compression coding means for adapting a quantization operation for the mode designated with said designating means, when the quantity-of-codes monitoring means determines that the quantity of code data reaches the predetermined volume; and
    controlling means for re-coding the code data previously generated by said first compression coding means by using said second compression coding means and storing the re-coded code data into predetermined storage means as code data after changing a parameter in said first compression coding means, in parallel with saving the coded data generated by said first compression coding means after changing a parameter as subsequent code data into said storage means, when a parameter is changed by said parameter setting means.

2. The apparatus according to claim 1, wherein modes of said quantization operation comprise a compression ratio preferred mode, a higher edge emphasis mode, and a lower edge emphasis mode.

3. The apparatus according to claim 2, wherein modes of said quantization operation further comprise an image quality preferred mode.

4. The apparatus according to claim 2, wherein, in said compression ratio preferred mode, all digits to the right of the decimal point of data after quantization are rounded-off in the initial stage, and all digits to the right of the decimal point of data after quantization are cut-off after quantity of code data reaches said predetermined volume.

5. The apparatus according to claim 2, wherein, in said edge emphasis mode, all digits to the right of the decimal point of data after quantization are rounded-off in the initial stage, and all digits to the right of the decimal point of data after quantization are conditionally rounded-up after quantity of code data reaches said predetermined volume.

6. The apparatus according to claim 5, wherein the conditional round-up is performed in a case in which data after quantization is a value over a predetermined value.

7. The apparatus according to claim 2, wherein, in the lower edge emphasis mode, all digits to the right of the decimal point of data after quantization are rounded-off in the initial stage, and all digits to the right of the decimal point of data after quantization are conditionally cut-off after quantity of code data reaches the predetermined volume.

8. The apparatus according to claim 7, wherein the conditional cut-off is performed in a case where data after quantization is a value over a predetermined value.

9. An image processing method for compression coding image data, comprising:
    a step of inputting a mode for a quantization operation with a predetermined designating means;
    a first compression coding step wherein a quantization step and a parameter involved in a quantization operation can be changed;
    a second compression coding step of decoding and re-compressing code data compressed in said first compression coding step wherein a quantization step and a parameter involved in a quantization operation can be changed;
    a quantity-of-codes monitoring step for monitoring a quantity of code data generated in said first compression coding step and determining whether or not the quantity of code data reaches a predetermined volume;
    a parameter setting step of making said quantization step the step in the next stage, in parallel with setting a parameter in said first and second compression coding steps for adapting a quantization operation for the mode designated with said designating means, when the quantity of code data is determined to reach the predetermined volume at the quantity-of-codes monitoring step; and
    a controlling step of re-coding the code data previously generated in said first compression coding step in said second compression coding step and storing the re-coded code data into predetermined storage means as code data after changing a parameter in said first compression coding step, in parallel with saving the coded data generated in said first compression coding step after changing a parameter as subsequent code data into said storage means, when a parameter is changed in said parameter setting step.

10. A computer readable medium storing a computer program for functioning as an image processing apparatus for compression coding image data by causing a computer to execute the program, wherein the computer program functions as:
    designating means for designating a mode for a quantization operation;
    first compression coding means wherein a quantization step and a parameter involved in a quantization operation can be changed;
    second compression coding means for decoding and re-compressing code data compressed by said first compression coding means wherein a quantization step and a parameter involved in a quantization operation can be changed;
    quantity-of-codes monitoring means for monitoring a quantity of code data generated by said first compression coding means and determining whether or not the quantity of code data reaches a predetermined volume;
    parameter setting means for making said quantization step the step in the next stage, in parallel with setting a parameter in said first and second compression coding means for adapting a quantization operation for the mode designated with said designating means, when the quantity-of-codes monitoring means determines that the quantity of code data reaches the predetermined volume; and controlling means for re-coding the code data previously generated by said first compression coding means by using said second compression coding means and storing the re-coded code data into predetermined storage means as code data after changing a parameter in said first compression coding means, in parallel with saving the coded data generated by said first compression coding means after changing a parameter as subsequent code data into said storage means, when a parameter is changed with said parameter setting means.

11. An image processing apparatus for compression coding image data, comprising:

designating means for designating a mode for a quantization operation;

first compression coding means wherein a quantization step and a parameter involved in a quantization operation can be changed;

second compression coding means for compressing with a quantization step higher than that in said first compression coding means, wherein a quantization step and a parameter involved in a quantization operation can be changed;

quantity-of-codes monitoring means for monitoring a quantity of code data generated by said first compression coding means and determining whether or not the quantity of code data reaches a predetermined volume;

parameter setting means for updating a quantization step in said first compression coding means by a quantization step used in said second compression coding means and setting the quantization step in said second compression coding means in the next stage, in parallel with setting a parameter in said first and second compression coding means for adapting a quantization operation for the mode designated by said designating means, when the quantity-of-codes monitoring means determines that the quantity of code data reaches the predetermined volume; and controlling means for having the data coded with said second compression coding means saved in predetermined storage means as code data previously generated by said first compression coding means and having the coded data generated by said first compression coding means after changing of a parameter as subsequent code data into said storage means, when a parameter is changed by the parameter setting means.

12. The apparatus according to claim 11, wherein modes of said quantization operation comprise a compression ratio preferred mode, a higher edge emphasis mode, and a lower edge emphasis mode.

13. The apparatus according to claim 12, wherein modes of said quantization operation further comprise an image quality preferred mode.

14. The apparatus according to claim 12, wherein, in the compression ratio preferred mode, all digits to the right of the decimal point of data after quantization are rounded-off in the initial stage, and all digits to the right of the decimal point of data after quantization are cut-off after quantity of code data reaches the predetermined volume.

15. The apparatus according to claim 12, wherein, in the higher edge emphasis mode, all digits to the right of the decimal point of data after quantization are rounded-off in the initial stage, and all digits to the right of the decimal point of data after quantization are conditionally rounded-up after quantity of code data reaches the predetermined volume.

16. The apparatus according to claim 15, wherein the conditional round-up is performed in a case in which data after quantization is a value over a predetermined value.

17. The apparatus according to claim 12, wherein, in said lower emphasis mode, all digits to the right of the decimal point of data after quantization are rounded-off in the initial stage, and all digits to the right of the decimal point of data after quantization are conditionally cut-off after quantity of code data reaches the predetermined volume.

18. The apparatus according to claim 17, wherein the conditional cut-off is performed in a case in which data after quantization is a value over a predetermined value.

19. An image processing method for compression coding image data, comprising:

a step of inputting a mode for a quantization operation with a predetermined designating means;

a first compression coding step wherein a quantization step and a parameter involved in a quantization operation can be changed;

a second compression coding step of compressing with a quantization step higher than that in said first compression coding step, wherein a quantization step and a parameter involved in a quantization operation can be changed;

a quantity-of-codes monitoring step of monitoring a quantity of code data generated in said first compression coding step and determining whether or not the quantity of code data reaches a predetermined volume;

a parameter setting step of updating a quantization step in said first compression coding step by a quantization step used in said second compression coding step and setting the quantization step in said second compression coding step in the next stage, in parallel with setting a parameter in said first and second compression coding step for adapting a quantization operation for the mode designated with said designating means, when the quantity-of-codes monitoring step determines that the quantity of code data reaches the predetermined volume; and a controlling step of having the data coded in said second compression coding step saved in predetermined storage means as code data previously generated in said first compression coding step and having the coded data generated in said first compression coding step after changing of a parameter as subsequent code data into said storage means, when a parameter is changed in said parameter setting step.

20. A computer readable medium storing a computer program for functioning as an image processing apparatus for compression coding image data by causing a computer to read and execute the program, wherein the computer program functions as:

designating means for designating a mode for a quantization operation;

first compression coding means wherein a quantization step and a parameter involved in a quantization operation can be changed;

second compression coding means for compressing with a quantization step higher than that in said first compression coding means, wherein a quantization step and a parameter involved in a quantization operation can be changed;

quantity-of-codes monitoring means for monitoring a quantity of code data generated by said first compression coding means and determining whether the quantity of code data reaches a predetermined volume or not;

parameter setting means for updating a quantization step in said first compression coding means by a quantization step used in said second compression coding means and setting the quantization step in said second compression coding means in the next stage, in parallel with setting a parameter in said first and second compression coding means for adapting a quantization operation for the mode designated by said designating means, when the quantity-of-codes monitoring means determines that the quantity of code data reaches the predetermined volume; and controlling means for having the data coded by said second compression coding means saved in a predetermined storage means as code data previously generated by said first compression coding means and having the coded data generated by said first compression coding means after changing of a parameter as subsequent code data into said storage means, when a parameter is changed by said parameter setting means.

* * * * *

UNITED STATES PATENT AND TRADEMARK OFFICE
CERTIFICATE OF CORRECTION

| | | |
|---|---|---|
| PATENT NO. | : 7,127,115 B2 | |
| APPLICATION NO. | : 10/393069 | |
| DATED | : October 24, 2006 | |
| INVENTOR(S) | : Hidefumi Osawa et al. | |

It is certified that error appears in the above-identified patent and that said Letters Patent is hereby corrected as shown below:

COLUMN 1:

Line 53, "an" should be deleted.

COLUMN 8:

Line 59, "image need not to" should read --an image need not--.

COLUMN 9:

Line 13, "data" should read --data of--;
Line 14, "page" should read --pages--;
Line 17, "one page" should read --pages--; and
Line 22, "lefts" should read --is left--.

COLUMN 11:

Line 29, "matter" should read --a matter--.

COLUMN 18:

Line 26, "that" should read --wherein--.

COLUMN 19:

Line 9, "Configuration" should read --configuration--.

Signed and Sealed this

Twenty-sixth Day of June, 2007

JON W. DUDAS
*Director of the United States Patent and Trademark Office*